(12) United States Patent
Sakai et al.

(10) Patent No.: US 10,499,047 B2
(45) Date of Patent: Dec. 3, 2019

(54) IMAGE PROCESSING APPARATUS, IMAGE PROCESSING SYSTEM, AND NON-TRANSITORY COMPUTER READABLE MEDIUM

(71) Applicant: FUJI XEROX CO., LTD., Tokyo (JP)

(72) Inventors: Noriko Sakai, Kanagawa (JP); Toshihiro Iwafuchi, Kanagawa (JP); Masashi Morimoto, Kanagawa (JP); Yusuke Izumisawa, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/915,222

(22) Filed: Mar. 8, 2018

(65) Prior Publication Data
US 2019/0098292 A1    Mar. 28, 2019

(30) Foreign Application Priority Data
Sep. 27, 2017   (JP) .................. 2017-187251

(51) Int. Cl.
| H04N 17/00 | (2006.01) |
| H04N 9/73 | (2006.01) |
| H04N 9/64 | (2006.01) |
| H04N 1/00 | (2006.01) |
| H04N 1/62 | (2006.01) |

(52) U.S. Cl.
CPC ....... *H04N 17/002* (2013.01); *H04N 1/00129* (2013.01); *H04N 1/62* (2013.01); *H04N 9/646* (2013.01); *H04N 9/735* (2013.01); *H04N 2201/0084* (2013.01)

(58) Field of Classification Search
CPC .. H04N 17/002; H04N 1/00129; H04N 9/646; H04N 9/735
USPC ..... 348/184, 180, 175, 50, 49, 220.1, 223.1, 348/706, 719, 746; 345/593, 690; 358/1.9, 1.18, 450, 518, 523; 382/167; 375/240.23
See application file for complete search history.

(56) References Cited

U.S. PATENT DOCUMENTS

| 8,723,893 B2 * | 5/2014 | Ohnishi | G09G 5/026 345/690 |
| 9,536,322 B1 * | 1/2017 | Smith | G06K 9/4652 |
| 2003/0034986 A1 * | 2/2003 | Fukasawa | H04N 1/6027 345/591 |
| 2004/0021882 A1 * | 2/2004 | Kakutani | H04N 1/6019 358/1.9 |
| 2004/0075754 A1 * | 4/2004 | Nakajima | H04N 1/00129 348/231.6 |

(Continued)

FOREIGN PATENT DOCUMENTS

JP    2009-225479 A    10/2009

*Primary Examiner* — Jefferey F Harold
*Assistant Examiner* — Mustafizur Rahman
(74) *Attorney, Agent, or Firm* — Sughrue Mion, PLLC

(57) ABSTRACT

An image processing apparatus includes a reception unit that receives a pair of image information including image information before color conversion and image information after the color conversion, an accuracy output unit that outputs accuracy of a color conversion characteristic from a plural of pairs of image information received by the reception unit, and a display control unit that displays the accuracy output from the accuracy output unit on a display apparatus for color areas.

11 Claims, 16 Drawing Sheets

(56) References Cited

U.S. PATENT DOCUMENTS

| | | | | |
|---|---|---|---|---|
| 2004/0201726 A1* | 10/2004 | Bloom | .................. | H04N 9/735 |
| | | | | 348/223.1 |
| 2005/0244051 A1* | 11/2005 | Shiohara | ............... | G06T 11/001 |
| | | | | 382/162 |
| 2006/0028483 A1* | 2/2006 | Kondo | .................... | G09G 5/02 |
| | | | | 345/594 |
| 2007/0285694 A1* | 12/2007 | Horita | .................... | H04N 1/603 |
| | | | | 358/1.9 |
| 2008/0088826 A1* | 4/2008 | Ohyama | .................. | G01J 3/36 |
| | | | | 356/51 |
| 2008/0198935 A1* | 8/2008 | Srinivasan | ......... | H04N 21/6547 |
| | | | | 375/240.23 |
| 2008/0285848 A1* | 11/2008 | Meyer | .................. | G06K 9/4652 |
| | | | | 382/165 |
| 2009/0010535 A1* | 1/2009 | Koishi | .................. | G06T 11/001 |
| | | | | 382/167 |
| 2009/0059096 A1* | 3/2009 | Yamamoto | ............ | G06T 3/0081 |
| | | | | 348/746 |
| 2009/0273609 A1* | 11/2009 | Ohnishi | ................ | G06T 11/001 |
| | | | | 345/593 |
| 2009/0273615 A1* | 11/2009 | Ohnishi | ................ | G09G 5/026 |
| | | | | 345/690 |
| 2009/0315911 A1* | 12/2009 | Ohnishi | ................ | G06T 11/001 |
| | | | | 345/593 |
| 2010/0172567 A1* | 7/2010 | Prokoski | ............. | A61B 5/0064 |
| | | | | 382/132 |
| 2010/0189350 A1* | 7/2010 | Shohara | ................ | H04N 9/045 |
| | | | | 382/167 |
| 2012/0218570 A1* | 8/2012 | Tanaka | ............... | H04N 1/40012 |
| | | | | 358/1.9 |
| 2015/0098510 A1* | 4/2015 | Ye | ........................ | H04N 19/597 |
| | | | | 375/240.16 |
| 2016/0163252 A1* | 6/2016 | Sugiyama | ............... | G09G 3/006 |
| | | | | 345/589 |

\* cited by examiner

IMAGE INFORMATION
BEFORE COLOR ADJUSTMENT

RGBa1 = {0, 0, 255}
RGBa2 = {0, 32, 255}
RGBa3 = {0, 64, 255}
RGBa4 = {0, 96, 255}
RGBa5 = {0, 128, 255}

IMAGE BEFORE COLOR ADJUSTMENT

IMAGE INFORMATION
AFTER COLOR ADJUSTMENT

RGBb1 = {16, 0, 255}
RGBb2 = {16, 32, 255}
RGBb3 = {32, 64, 255}
RGBb4 = {32, 96, 255}
RGBb5 = {64, 128, 255}

IMAGE AFTER COLOR ADJUSTMENT

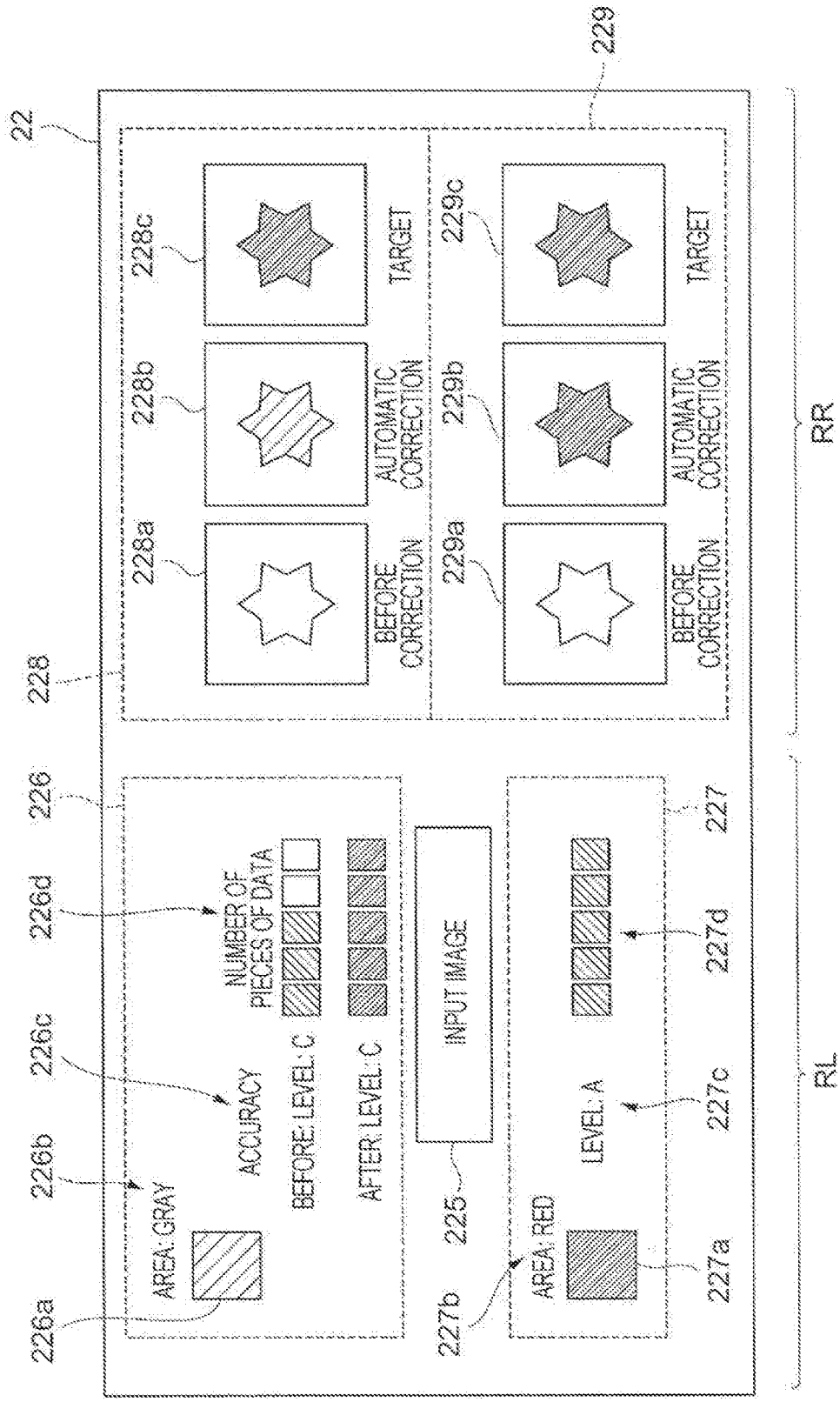

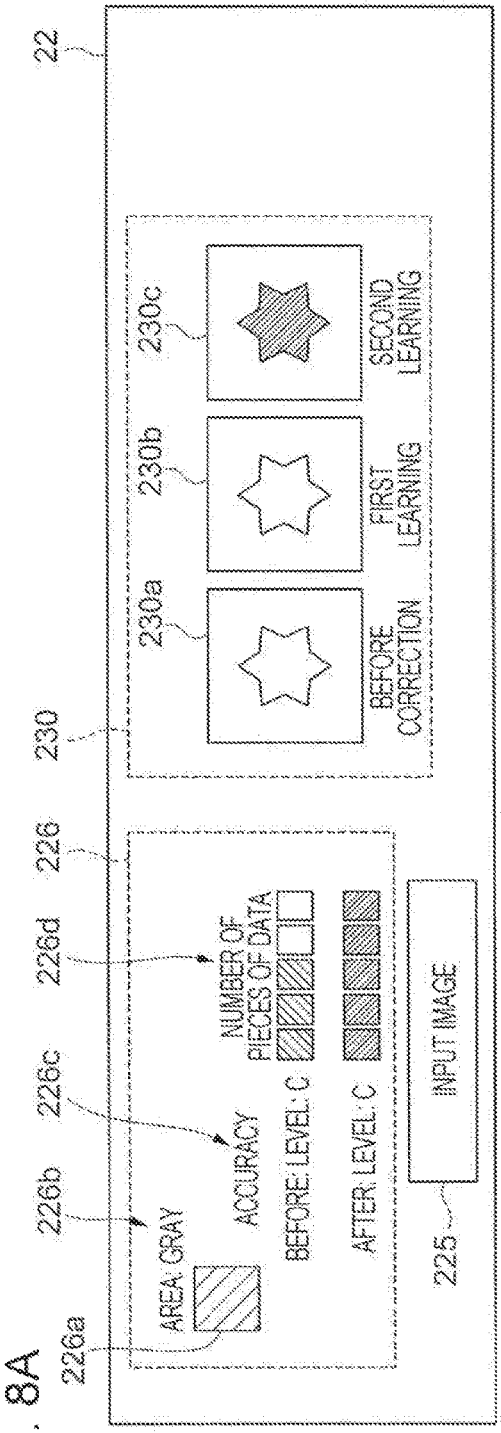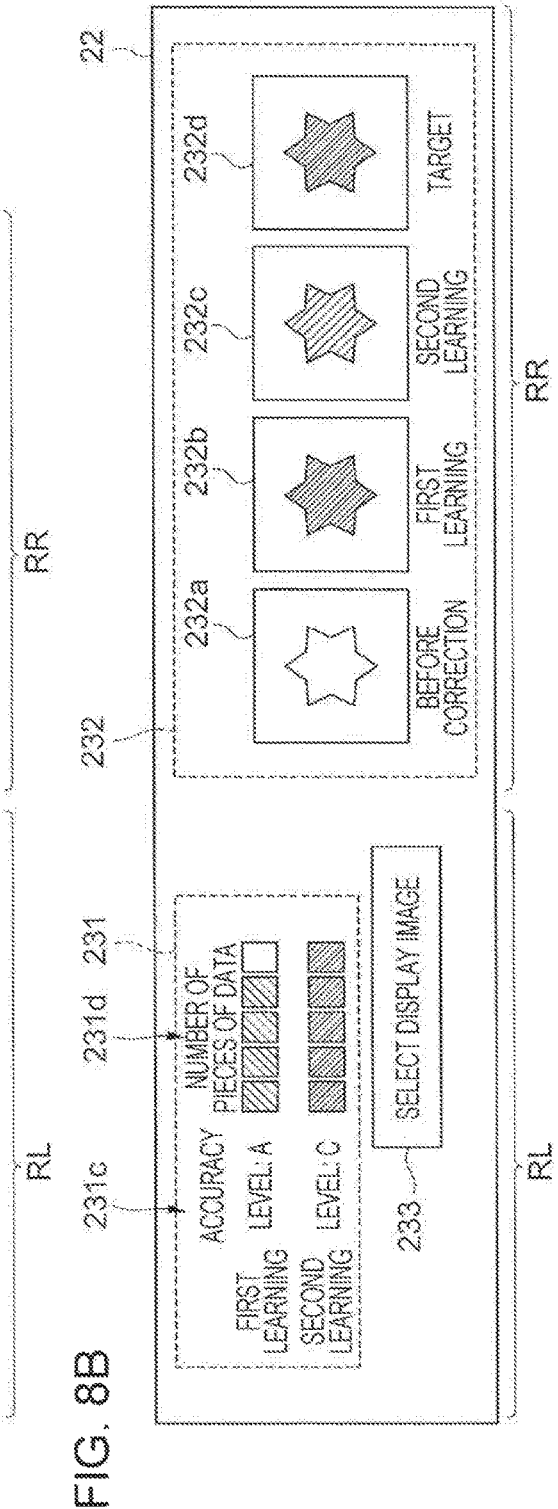

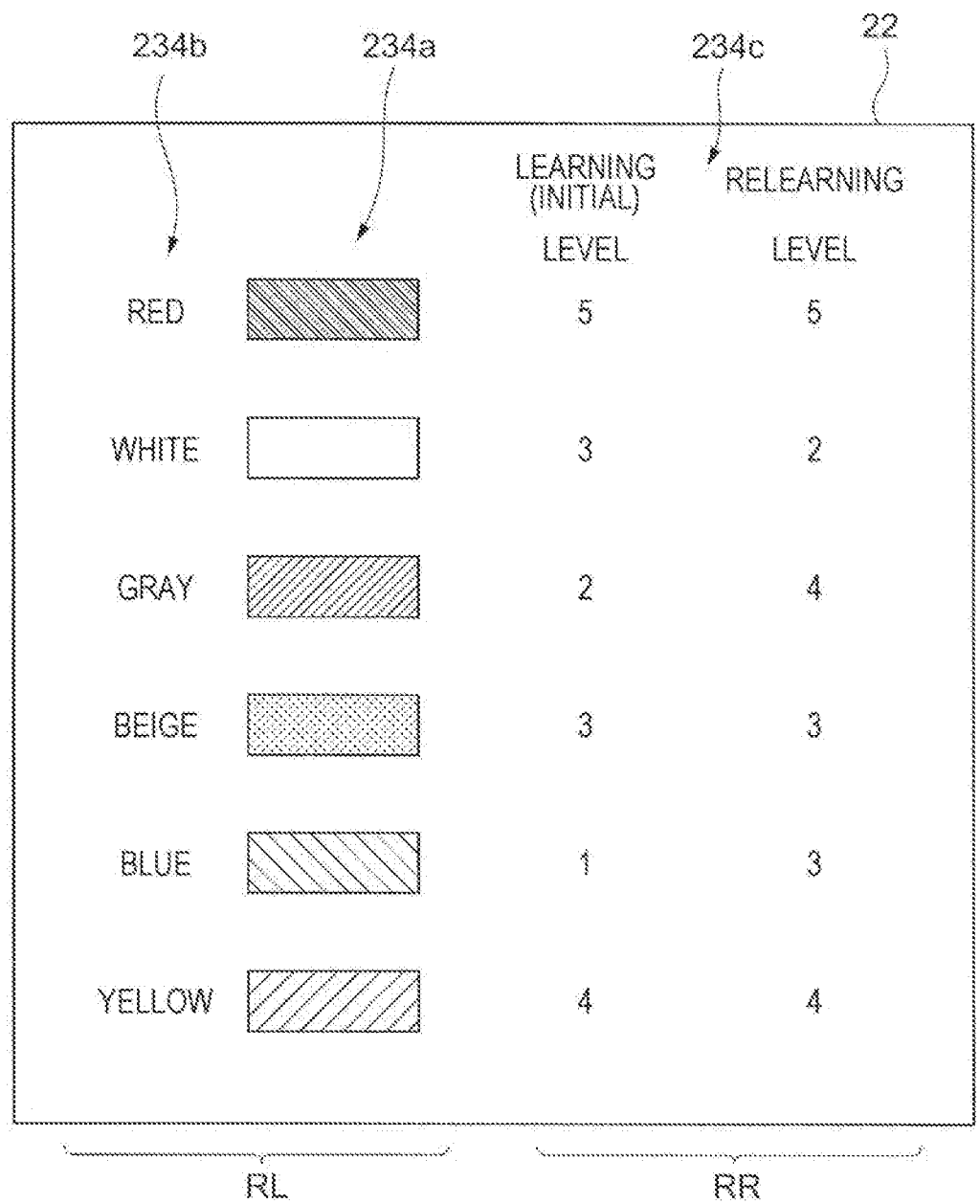

IMAGE PROCESSING APPARATUS, IMAGE PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-187251 filed Sep. 27, 2017.

BACKGROUND (i) Technical Field

The present invention relates to an image processing apparatus, an image processing system, and a non-transitory computer readable medium.

(ii) Related Art

Since devices such as digital cameras, smartphones, and tablets have gained in popularity, users are increasingly capturing and viewing digital images. Environments in which the users capture images vary depending on lighting conditions and the like, and imaging targets also vary. Captured images, therefore, are often not ones that the users have intended, and it is common to adjust hues of the images.

SUMMARY

According to an aspect of the invention, there is provided an image processing apparatus including a reception unit that receives a pair of image information including image information before color conversion and image information after the color conversion, an accuracy output unit that outputs accuracy of a color conversion characteristic from plural pairs of image information received by the reception unit, and a display control unit that displays the accuracy output from the accuracy output unit on a display apparatus for color areas.

BRIEF DESCRIPTION OF THE DRAWINGS

Exemplary embodiments of the present invention will be described in detail based on the following figures, wherein:

FIG. 7 is a diagram illustrating a first example in which display information created by a second accuracy evaluation display unit is displayed on the display unit of the display apparatus;

FIG. 8A is a diagram illustrating a second example in which the display information created by the second accuracy evaluation display unit is displayed on the display unit of the display apparatus and FIG. 8B is a diagram illustrating a third example in which the display information created by the second accuracy evaluation display unit is displayed on the display unit of the display apparatus;

FIG. 9 is a diagram illustrating a fourth example in which the display information created by the second accuracy evaluation display unit is displayed on the display unit of the display apparatus;

DETAILED DESCRIPTION

Exemplary embodiments of the present invention will be described in detail hereinafter with reference to the accompanying drawings.

Image Processing System

Figure 1:
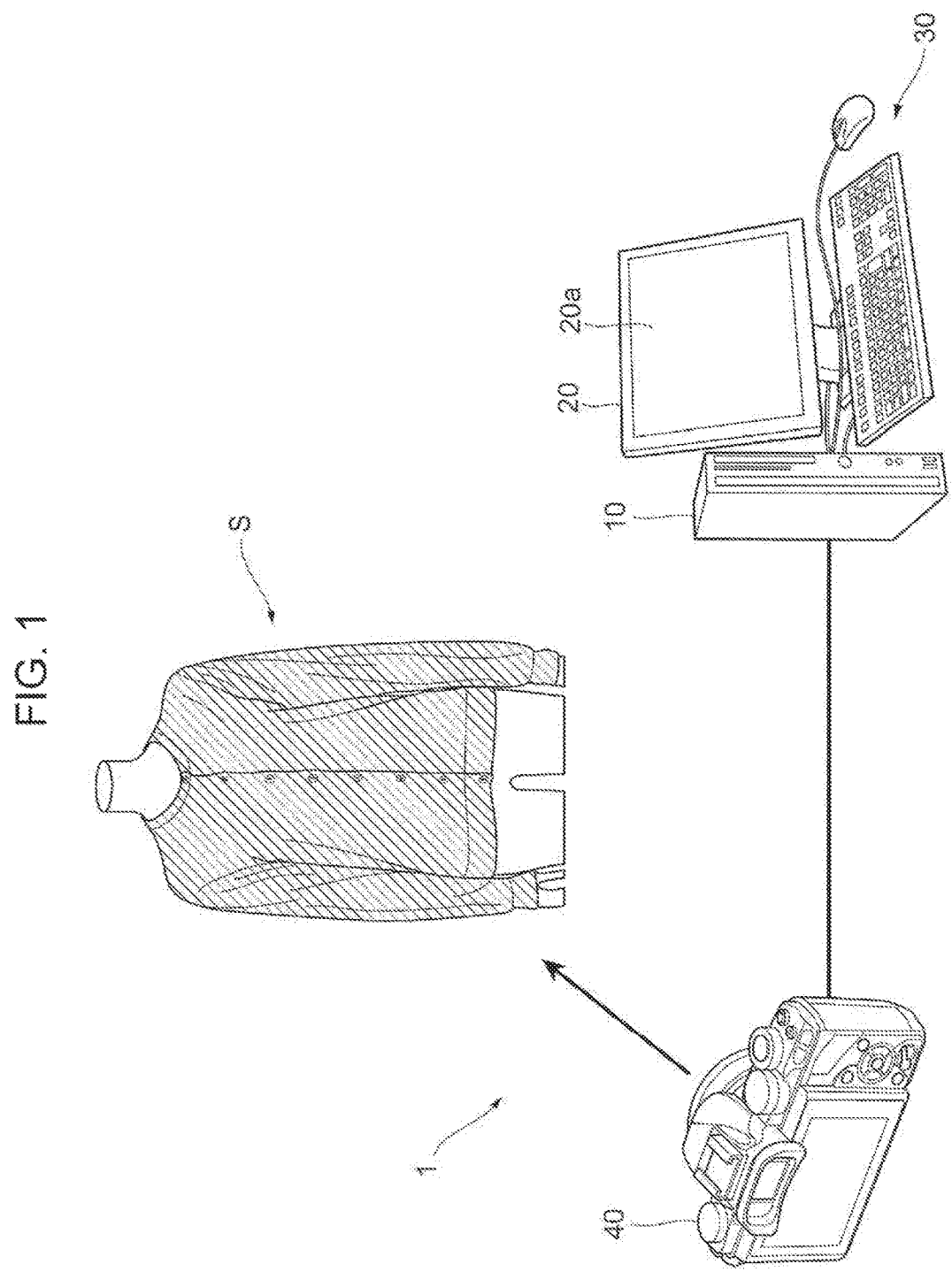
FIG. 1 is a diagram illustrating an example of the configuration of an image processing system according to an exemplary embodiment.

FIG. 1 is a diagram illustrating an example of the configuration of an image processing system 1 according to an exemplary embodiment.

As illustrated in FIG. 1, the image processing system 1 according to the present exemplary embodiment includes an image processing apparatus 10 that performs color adjustment (color conversion) on an original image captured by a camera 40, a display apparatus 20 that displays an image on the basis of display information input from the image processing apparatus 10, an input apparatus 30 that allows a user to input various pieces of information to the image processing apparatus 10, and a camera 40 that captures an image of an imaging target S and that generates image information to be used by the image processing apparatus 10 to perform color adjustment.

The image processing apparatus 10 is, for example, a general-purpose personal computer (PC). The image processing apparatus 10 performs color adjustment and the like by operating various pieces of application software under control of an operating system (OS).

The image processing apparatus 10 includes a central processing unit (CPU), which is a processing unit. The image processing apparatus 10 also includes a memory and a hard disk drive (HDD), which are storage units. The CPU executes various pieces of software such as the OS (basic software) and application programs (applied software). The memory is a storage area storing the various pieces of software, data used to execute the various pieces of software, and the like. The HDD is a storage area storing input and output data of the various pieces of software and the like.

The image processing apparatus 10 also includes a communication interface for communicating with the outside and input devices such as a keyboard and a mouse.

The display apparatus 20 displays images on a display screen 20a. The display apparatus 20 is an apparatus having a function of displaying images, such as a liquid crystal display, a liquid crystal television set, or a projector for a PC. A display method used by the display apparatus 20, therefore, is not limited to a liquid crystal method. Although the display screen 20a is provided in the display apparatus 20 in the example illustrated in FIG. 1, the display screen 20a is a screen or the like provided outside the display apparatus 20 when a projector is used as the display apparatus 20.

The input apparatus 30 includes the keyboard and the mouse. The input apparatus 30 is used by the user to input an instruction to the image processing apparatus 10 when the user activates or ends application software for performing color adjustment or performs color adjustment.

The camera 40 is an example of an imaging apparatus and includes, for example, an optical system for converging incident light and an image sensor, which is an imaging unit that detects the light converged by the optical system.

The optical system includes a single lens or a combination of plural lenses. In the optical system, various aberrations are eliminated by the combination of lenses, coating of surfaces of the lenses, and the like. In the image sensor, imaging devices such as charge-coupled devices (CCDs) or complementary metal-oxide-semiconductor (CMOS) devices are arranged.

The image processing apparatus 10 and the display apparatus 20 are connected to each other through a digital visual interface (DVI). Alternatively, the image processing apparatus 10 and the display apparatus 20 may be connected to each other through a High-Definition Multimedia Interface (HDMI; registered trademark) or a DisplayPort.

The image processing apparatus 10 and the input apparatus 30 are connected to each other through a universal serial bus (USB) connector. Alternatively, the image processing apparatus 10 and the input apparatus 30 may be connected to each other through an Institute of Electrical and Electronics Engineers (IEEE) 1394 connector, a Recommended Standard 232C (RS-232C) connector, or the like.

In the example illustrated in FIG. 1, the image processing apparatus 10 and the camera 40 are connected to each other by wire, that is, for example, through a USB connector, an IEEE 1394 connector, or an RS-232C connector. Image information regarding an image captured by the camera 40, therefore, can be transmitted to the image processing apparatus 10 through the wire. A connection method is not limited to this, and wireless connection such as wireless local area network (LAN) or Bluetooth (registered trademark) may be employed, instead. Alternatively, the image processing apparatus 10 and the camera 40 need not be connected to each other, and a memory card such as a secure digital (SD) card may be used to transfer image information to the image processing apparatus 10.

In the image processing system 1, first, the user captures an image of the imaging target S using the camera 40. The image captured by the camera 40 is an original image, and image information regarding the original image is transmitted to the image processing apparatus 10. The display apparatus 20 then displays the original image, which is an image before color adjustment. Next, the user inputs, using the input apparatus 30, an instruction to perform color adjustment to the image processing apparatus 10, and the image processing apparatus 10 performs color adjustment on the original image. A result of the color adjustment is reflected by the image displayed on the display apparatus 20, that is, for example, an image different from that before the color adjustment is displayed on the display apparatus 20 as an image after the color adjustment.

The image after the color adjustment may be an image after color adjustment performed by the image processing apparatus 10 or may be another image captured by another camera whose model characteristics are different from those of the camera 40, that is, whose imaging conditions are different from those of the camera 40. In this case, an image captured by the camera 40 can be regarded as an image before color adjustment, and another image captured by a camera whose imaging conditions are different from those of the camera 40 can be regarded as an image after the color adjustment.

The image processing apparatus 10 also creates a color conversion characteristic (color conversion model) on the basis of a result of color adjustment. A color conversion model indicates a relationship between image information before color adjustment and image information after the color adjustment. A color conversion model can also be seen as a function indicating a relationship between image information before color adjustment and image information after the color adjustment. When color conversion vectors whose initial points are image information before color adjustment and whose final points are image information after the color adjustment are assumed, a color conversion model can be seen as a group of the color conversion vectors (color conversion vector group), details of which will be described later. If image information is RGB data including red (R), green (G), and blue (B), and if image information before color adjustment is denoted as $(R_a, G_a, B_a)$ and image information after the color adjustment is denoted as $(R_b, G_b, B_b)$, for example, a color conversion model indicates a relationship between $(R_a, G_a, B_a)$ and $(R_b, G_b, B_b)$.

The image processing apparatus 10 also creates, on the basis of a color conversion model, a conversion relationship for converting image information regarding an original image before color adjustment into image information after the color adjustment. A conversion relationship is conversion information for converting image information before color adjustment into image information after the color adjustment. The conversion relationship can be created as a lookup table (LUT). The LUT may be a multidimensional LUT or a one-dimensional LUT. The conversion relationship need not be a LUT and may be a multidimensional matrix. The conversion relationship may be held as training data for learning (input/output data pair), instead of a multidimensional LUT, an LUT, or a matrix.

When image information is RGB data, the conversion relationship is information for converting $(R_a, G_a, B_a)$, which is image information before color adjustment, into $(R_b, G_b, B_b)$, which is image information after the color adjustment. By using the conversion relationship, the same color adjustment operation as one performed before can be performed again. That is, by performing color conversion using the conversion relationship when image information before color adjustment is newly generated, the same color adjustment operation as one performed before can be performed again to generate image information after the color adjustment.

When the conversion relationship is a multidimensional LUT, a three-dimensional LUT is used herein to directly convert $(R_a, G_a, B_a)$ into $(R_b, G_b, B_b)$. That is, $(R_a, G_a, B_a)$ is converted into ($R_b$, $G_b$, $B_b$). When the conversion relationship is a one-dimensional LUT, each of R, G, and B is converted. That is, $R_a$ is converted into $R_b$, $G_a$ is converted into $G_b$, and $B_a$ is converted into $B_b$. Although conversion in an RGB color space is taken as an example in the present exemplary embodiment, conversion in another color space, such as a CMYK color space, may be performed, instead. In this case, image information is CMYK data including cyan (C), magenta (M), yellow (Y), and black (K). When the conversion relationship is a multidimensional LUT, a four-dimensional LUT is used in this case to convert ($C_a$, $M_a$, $Y_a$, $K_a$), which is image information before color adjustment, into ($C_b$, $M_b$, $Y_b$, $K_b$), which is image information after the color adjustment. When the conversion relationship is a one-dimensional LUT, each of C, M, Y, and K is converted. That is, $C_a$ is converted into $C_b$, $M_a$ is converted into $M_b$, $Y_a$ is converted into $Y_b$, and $K_a$ is converted into $K_b$.

The image processing system 1 according to the present exemplary embodiment is not limited to that illustrated in FIG. 1. A tablet terminal, for example, may be used as the image processing system 1. In this case, the tablet terminal includes a touch panel, which displays images and receives instructions from the user, such as touches. That is, the touch panel functions as the display apparatus 20 and the input apparatus 30. As the camera 40, a built-in camera of the tablet terminal can be used. Another apparatus including both the display apparatus 20 and the input apparatus 30 is a touch monitor. In the touch monitor, a touch panel is used as the display screen 20a of the display apparatus 20. In this case, the touch monitor displays images on the basis of first image information output from the image processing apparatus 10. The user then inputs an instruction to perform color adjustment by touching the touch monitor.

As described above, in order for the image processing apparatus 10 to create a conversion relationship, image information before color adjustment needs to be obtained from an original image, and image information after the color adjustment needs to be obtained from an image after the color adjustment. That is, image information before color adjustment and image information after the color adjustment need to be obtained as a pair of image information.

If the accuracy of plural pairs of image information before and after color adjustment is low at this time, it is difficult to create an accurate color conversion mode, thereby decreasing the accuracy of a conversion relationship. More specifically, when color adjustment is performed, data whose directivity of color adjustment is different might be mixed in and decreases the accuracy of a color conversion model obtained from plural pairs of image information. Such a situation occurs, for example, when an unskillful user has performed color adjustment or when an environment in which color adjustment has been performed varies. The variation in environment is, for example, variation in device characteristics of the display apparatus 20 or variation in lighting conditions. When data whose directivity of color adjustment is different has been mixed in, the directivity of color adjustment becomes inconsistent, and it becomes difficult to create an accurate color conversion model. If color adjustment is performed using a conversion relationship created under this condition, for example, a result of color adjustment that is not intended by the user might be obtained, or color adjustment whose amount of change is small might be performed.

As described above, the accuracy of plural pairs of image information before and after color adjustment is an indicator indicating whether the directivity of color adjustment is consistent. The accuracy can also be seen as an indicator indicating the quality of plural pairs of image information before and after color adjustment in the creation of a color conversion model and a conversion relationship. The accuracy can be quantified and evaluated on the basis of color conversion vectors whose initial points are image information before color conversion and whose final points are image information after the color conversion, details of which will be described later. The accuracy may be based on all of plural pairs of image information for creating a color conversion model or only some of the plural pairs of image information.

A color conversion model thus needs to be accurate. It is difficult, however, for the user to evaluate the accuracy of a color conversion model. In addition, when an accurate color conversion model has not been created, it is difficult to identify a cause.

In the present exemplary embodiment, therefore, a relationship between the accuracy of a color conversion model and the accuracy of plural pairs of image information before and after color adjustment is focused upon, and the image processing apparatus 10 is configured as described later in order to avoid the above problem. That is, by evaluating the accuracy of plural pairs of image information before and after color adjustment, the accuracy of a color conversion model created on the basis of the plural pairs of image information is quantitatively evaluated.

In the following description, images input by the user in a beginning as an image before color adjustment and an image after the color adjustment will be referred to as "first images". The first images can also be seen as a basic set of images as a pair of images before and after color adjustment. Images input by the user in order to check the accuracy of plural pairs of image information before and after color adjustment as images before and after the color adjustment will be referred to as "second images". The second images can also be seen as a set of images used by the user to evaluate accuracy as a set of images before and after color adjustment. Images added by the user to the first images as images before and after color adjustment will be referred to as "third images". The third images can also be seen as a set of images added to the first images as a set of images before and after color adjustment.

Image Processing Apparatus 10 and Display Apparatus 20

Next, the image processing apparatus 10 and the display apparatus 20 will be described.

Figure 2:
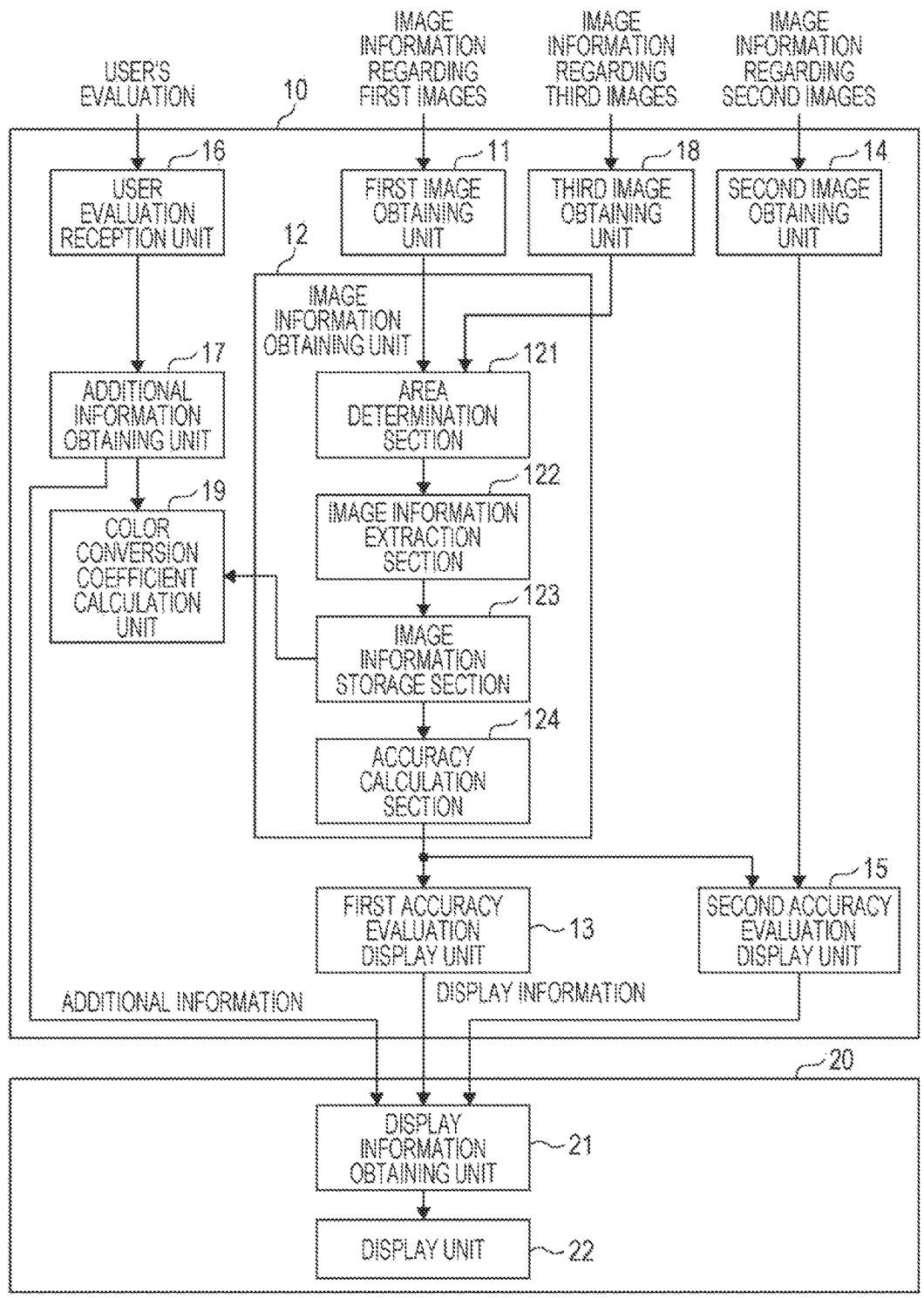
FIG. 2 is a block diagram illustrating an example of the functional configuration of an image processing apparatus and a display apparatus according to the exemplary embodiment.

FIG. 2 is a block diagram illustrating an example of the functional configuration of the image processing apparatus 10 and the display apparatus 20 according to the present exemplary embodiment. FIG. 2 only illustrates functions of the image processing apparatus 10 and the display apparatus 20 relevant to the present exemplary embodiment.

As illustrated in FIG. 2, the image processing apparatus 10 according to the present exemplary embodiment includes a first image obtaining unit 11 that obtains first image information, an image information obtaining unit 12 that obtains a pair of image information from first images, a first accuracy evaluation display unit 13 that displays images for evaluating the accuracy of plural pairs of image information, a second image obtaining unit 14 that obtains image information regarding second images used for evaluation, a second accuracy evaluation display unit 15 that displays images for evaluating the accuracy of plural pairs of image information on the basis of the image information regarding the second images, a user evaluation reception unit 16 that receives the user's evaluation, an additional information obtaining unit 17 that obtains information regarding images to be added as necessary, a third image obtaining unit 18 that obtains image information regarding third images to be added, and a color conversion coefficient calculation unit 19 that calculates color conversion coefficients as a conversion relationship.

The display apparatus 20 includes a display information obtaining unit 21 that obtains, from the image processing apparatus 10, display information for displaying images and a display unit 22 that displays the images on the basis of the display information. The display unit 22 corresponds to the display screen 20a.

The first image obtaining unit 11 obtains image information regarding images before and after color adjustment that are first images.

The image information has such a data format as to be displayed on the display apparatus 20 and is, for example, RGB data. The first image obtaining unit 11 may obtain image information in another data format and convert the image information into RGB data or the like.

The first image obtaining unit 11, therefore, functions as a reception unit that receives a pair of image information, which includes image information before and after color adjustment.

FIGS. 3(a) to 3(f) are diagrams illustrating an example of first images obtained by the first image obtaining unit 11.

Figure 3:
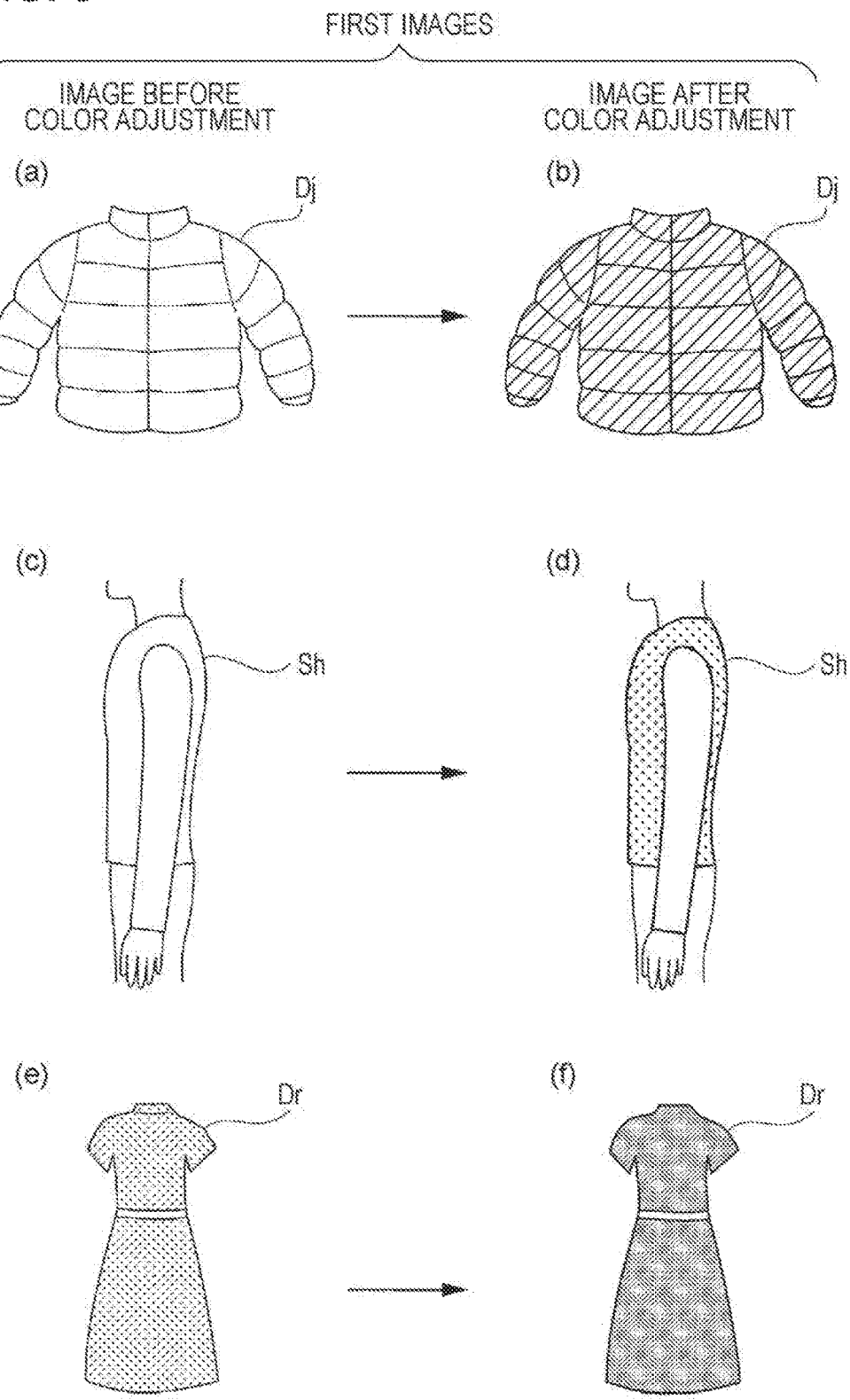
FIG. 3 is a diagram illustrating an example of first images obtained by a first image obtaining unit.

FIGS. 3(a) to 3(f) illustrate a case in which there are three pairs of image information obtained by capturing images of clothes for sale and a person wearing the clothes. FIGS. 3(a) and 3(b) illustrate first images obtained by capturing images of a down jacket Dj. FIG. 3(a) illustrates an image before color adjustment, and FIG. 3(b) illustrates an image after the color adjustment. FIGS. 3(c) and 3(d) illustrate first images obtained by capturing images of a person wearing a shirt Sh. FIG. 3(c) illustrates an image before color adjustment, and FIG. 3(d) illustrates an image after the color adjustment. FIGS. 3(e) and 3(f) illustrate first images obtained by capturing images of a dress Dr. FIG. 3(e) illustrates an image before color adjustment, and FIG. 3(f) illustrates an image after the color adjustment.

Plural pairs of images before and after color adjustment are thus prepared in the present exemplary embodiment in order to obtain pairs of image information including a large number of colors.

As illustrated in FIG. 2, the image information obtaining unit 12 includes an area determination section 121 that determines an area in images before and after color adjustment in which image information is to be extracted, an image information extraction section 122 that extracts a pair of image information, an image information storage section 123 that stores an extracted pair of image information, and an accuracy calculation section 124 that calculates the accuracy of pairs of image information.

The area determination section 121 determines, in either an image before color adjustment or an image after color adjustment, an area in which image information is to be extracted.

That is, for example, the area determination section 121 determines a position in one of the images illustrated in FIGS. 3(a) to 3(f) at which image information is to be obtained. In this case, color adjustment is performed within clothes for sale. That is, a color of a product needs to be subjected to strict color reproduction to make a color of the product displayed as an image match an actual color of the product. For this reason, a color of a product is often subjected to color adjustment.

More specifically, for example, the area determination section 121 determines an area other than a background as an area in which image information is to be extracted. In order to achieve this, the area determination section 121 needs to identify the background and the area other than the background. Image information regarding the background is substantially the same as image information regarding a left end of an image. The area determination section 121 can therefore determine an area in which image information is greatly different from the image information regarding the left end of the image as the area other than the background. In order to sample image information to be compared with the image information regarding the left end of the image, for example, the area determination section 121 determines pixel positions in the image at predetermined intervals and compares image information at the pixel positions with the image information regarding a pixel at the left end of the image. Alternatively, the area determination section 121 may use a mask of a predetermined size for image information and compare an average value of image information within the mask with image information regarding the pixel at the left end of the image.

Furthermore, in another method, the area determination section 121 conducts a frequency analysis on the basis of image information to obtain pixel positions at which high frequencies have been generated. Because the pixel positions indicate a contour of the area other than the background, the area determination section 121 determines the area inside the contour as the area other than the background. In a yet another method, the area determination section 121 sets an area of a predetermined size at the center of the image and determines the area as the area other than the background.

The area determination section 121 performs the above-described process on either an image before color adjustment or an image after the color adjustment to determine an area in which image information is to be extracted.

The image information extraction section 122 extracts image information in an area in either an image before color adjustment or an image after the color adjustment determined by the area determination section 121 and a corresponding area in the other image. In other words, the image information extraction section 122 extracts image information from images before and after color adjustment as a pair of image information regarding the images at corresponding positions.

That is, the image information extraction section 122 extracts image information before and after color adjustment from images before and after color adjustment at the same positions in the images.

Figure 4A:
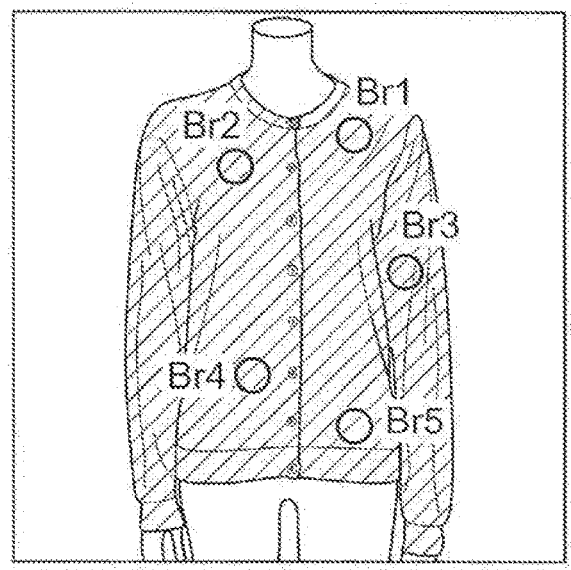
FIGS. 4A and 4B are diagrams illustrating an example of a pair of image information before and after color adjustment.
Figure 4B:
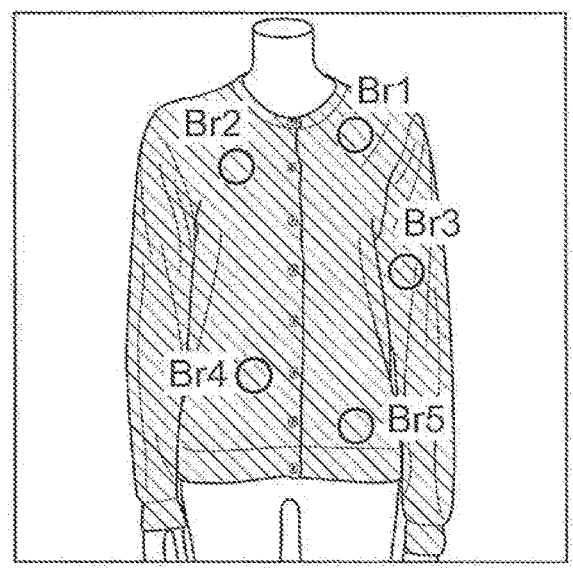

FIGS. 4A and 4B are diagrams illustrating an example of a pair of image information before and after color adjustment.

FIG. 4A illustrates an example of an image before color adjustment and image information before the color adjustment extracted from the image. Here, the image before the color adjustment is an image of a blouse, and image information extracted at positions Br1 to Br5 is denoted by RGBa1 to RGBa5. In this case, the blouse is blue, and the image information RGBa1 to RGBa5 is RGB data indicating blue.

FIG. 4B illustrates an example of an image after the color adjustment and image information after the color adjustment extracted from the image. Here, image information extracted at the same positions Br1 to Br5 as in FIG. 4A is denoted by RGBb1 to RGBb5.

The image information obtaining unit 12 obtains, using the above-described method, image information before color conversion and image information after the color adjustment as a pair of image information. The obtain pair of image information is stored in the image information storage section 123.

The accuracy calculation section 124 calculates the accuracy of plural pairs of image information extracted by the image information extraction section 122.

The accuracy calculation section 124 calculates the accuracy on the basis of color conversion vectors whose initial points are image information before color conversion and whose final points are image information after the color conversion.

Figure 5A:
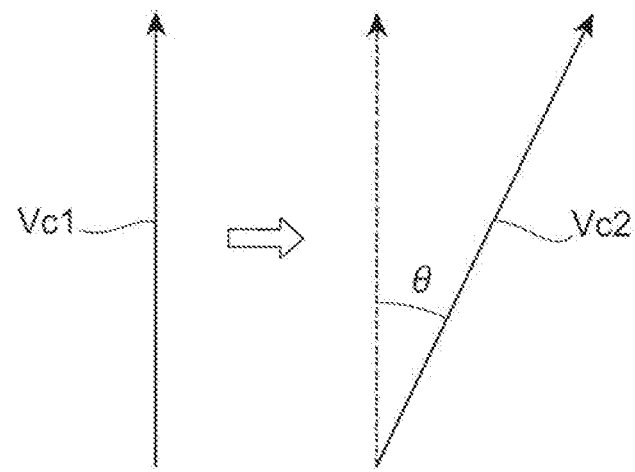
FIGS. 5A and 5B are diagrams illustrating methods for calculating accuracy from color conversion vectors.
Figure 5B:
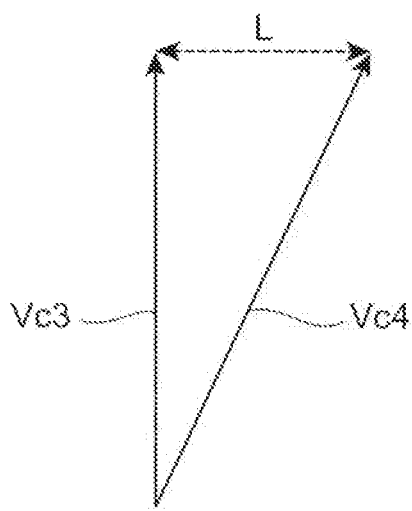

FIGS. 5A to 5B are diagrams illustrating methods for calculating accuracy from color conversion vectors.

FIG. 5A illustrates a case in which accuracy is calculated on the basis of an angle between plural color conversion vectors.

In the example illustrated in FIG. 5A, there are two color conversion vectors Vc1 and Vc2. As described above, initial points of the color conversion vectors Vc1 and Vc2 indicate image information (color values) before color conversion, and final points of the color conversion vectors Vc1 and Vc2 indicate image information (color values) after the color conversion. That is, the color conversion vectors Vc1 and Vc2 indicate movement directions and movement distances of image information as a result of the color conversion. An angle θ between the color conversion vectors Vc1 and Vc2 is assumed. If the directivity of color adjustment is the same and consistent in a certain color area, directions of color conversion vectors become the same, and the angle θ tends to be closer to 0. If the directivity of color adjustment is not the same or consistent, on the other hand, directions of color conversion vectors vary, and the angle θ tends to be large. That is, if the accuracy of plural pairs of image information obtained by the image information obtaining unit 12 is high, the angle θ between color conversion vectors tends to be small, and if the accuracy is low, the angle θ between color conversion vectors tends to be large. The accuracy, therefore, can be calculated from the angle θ between color conversion vectors.

FIG. 5B illustrates a case in which accuracy is calculated from a color difference between final points of color conversion vectors.

In the example illustrated in FIG. 5B, there are color conversion vectors Vc3 and Vc4. As image information regarding images before and after color conversion used as the color conversion vector Vc4, learning data, which will be described later, or non-learning data may be used. A difference (color difference) L between image information regarding a final point of the color conversion vector Vc3 and image information obtained by performing, on the basis of a color conversion characteristic, color conversion on image information regarding an image before the color conversion, which is an initial point, is assumed. That is, the difference (color difference) L between image information regarding a final point of the color conversion vector Vc3 and image information regarding a final point of the color conversion vector Vc4 is assumed. The color difference L can be seen as a Euclidean distance in a color space (e.g., an RGB color space) indicating the image information. If the directivity of color adjustment is the same and consistent in a certain color area, directions and magnitudes of the color conversion vectors Vc3 and Vc4 become the same, and positions of the final points hardly vary. As a result, the color different L tends to be small. If the directivity of color adjustment is not the same or consistent, on the other hand, directions and magnitudes of the color conversion vectors Vc3 and Vc4 vary, and the positions of the final points also tend to vary.

As a result, the color difference L tends to be large. That is, if the accuracy of plural pairs of image information obtained by the image information obtaining unit 12 is high, the color difference between the final points of the color conversion vectors Vc3 and Vc4 tends to be small, and if the accuracy is low, the color difference between the final points of the color conversion vectors Vc3 and Vc4 tends to be large. The accuracy, therefore, can be calculated from the color difference between the final points of the color conversion vectors Vc3 and Vc4.

The image information obtaining unit 12 may exclude a color conversion vector whose angle or color difference is greatly different from those of other color conversion vectors. In other words, the image information obtaining unit 12 may exclude a pair of image information that produces such a color conversion vector. That is, the directivity of color adjustment for such a pair of image information is greatly different from that of other color adjustment operations and is not suitable to calculate of accuracy or create an accurate color conversion model. The image information obtaining unit 12, therefore, may exclude such a pair of image information. A conventional statistical method may be used to determine whether an angle or a color difference of a color conversion vector is greatly different from those of other color conversion vectors.

The image information obtaining unit 12 can be regarded as an accuracy output unit that outputs the accuracy of a color conversion characteristic from plural pairs of image information received by the first image obtaining unit 11 or the third image obtaining unit 18.

The first accuracy evaluation display unit 13 creates display information for displaying the accuracy calculated in this manner. The first accuracy evaluation display unit 13 outputs the display information to the display apparatus 20 to display the display information.

Figure 6:
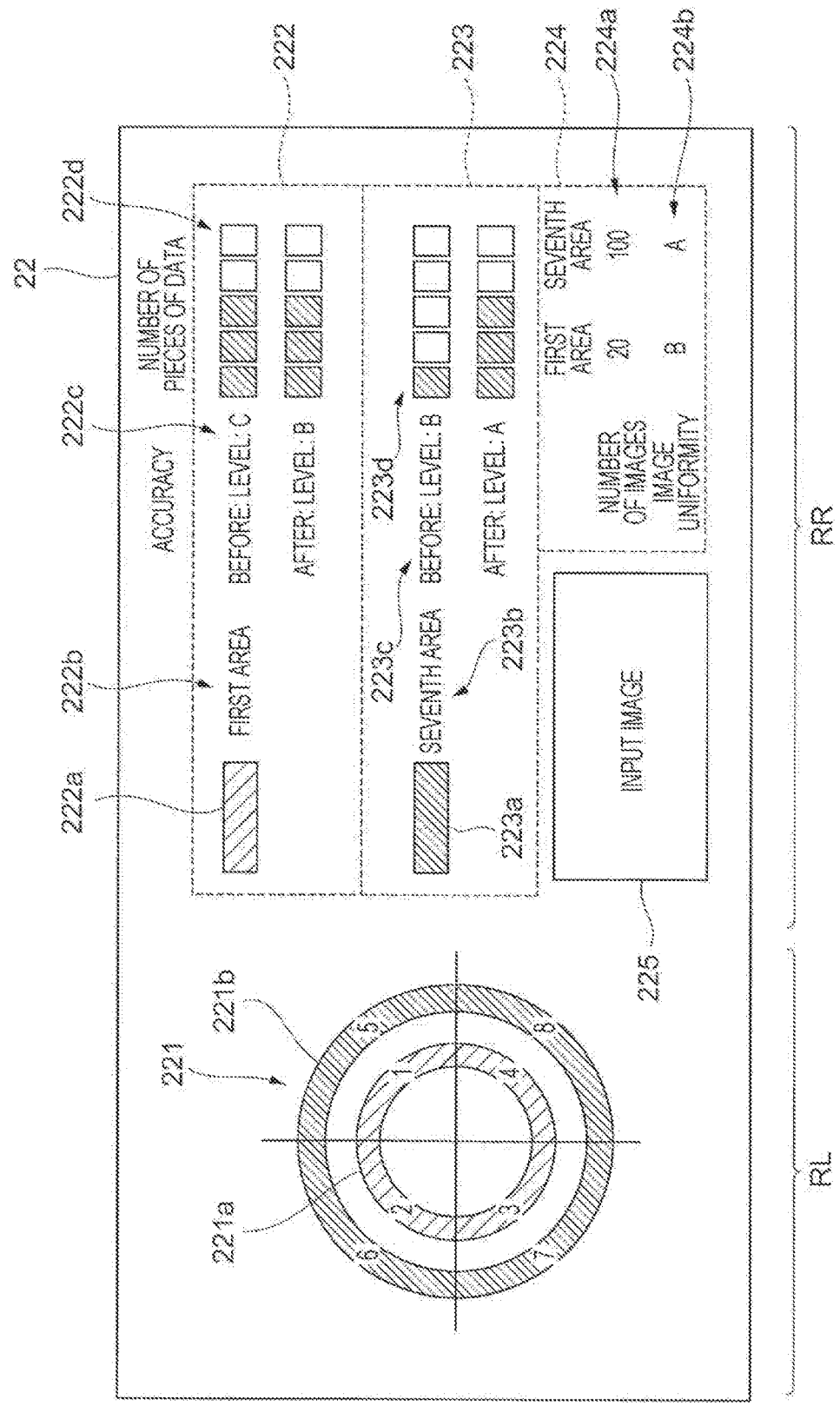
FIG. 6 is a diagram illustrating an example in which display information created by a first accuracy evaluation display unit is displayed on a display unit of the display apparatus.

FIG. 6 is a diagram illustrating an example in which display information created by the first accuracy evaluation display unit 13 is displayed on the display unit 22 of the display apparatus 20.

In the example illustrated in FIG. 6, a whole color area 221 for which accuracy has been calculated is displayed in a left area RL. Here, the whole color area 221 is displayed in the form of two circles 221a and 221b.

In the example illustrated in FIG. 6, the whole color area 221 is divided into first to eighth color areas. A "color area" refers to each of areas obtained by dividing a color space using a predetermined method. Here, the entirety of a color space used is divided in accordance with predetermined rules, and each of areas obtained as a result of the division will be referred to as a color area. More specifically, predetermined thresholds are provided for hue, saturation, and brightness, and areas obtained as a result of division based on these thresholds can be used as color areas. In FIG. 6, areas obtained as a result of division based on hue and saturation are used as color areas as an example.

In the present exemplary embodiment, the first accuracy evaluation display unit 13 calculates accuracy for each of the color areas.

In the example illustrated in FIG. 6, the inner circle 221a is provided with numbers 1 to 4, which indicate that accuracy has been calculated using the first to fourth areas in the whole color area 221. The outer circle 221b is provided with numbers 5 to 8, which indicate that accuracy has been calculated using the fifth to eighth areas in the whole color area 221. Colors of the first to eighth areas are actual colors in the first to eighth areas. The two circles 221a and 221b, therefore, indicate color areas while combining accuracy levels displayed for the color areas.

In the example illustrated in FIG. 6, information including accuracy in the first and seventh areas of the whole color area 221 is displayed in a right area RR.

Information regarding a color area whose accuracy is low is displayed in an area 222. It is assumed here that the accuracy of the first area is low.

In the area 222a, the color of the first area is displayed as a color sample 222a, and "first area" is displayed as area information 222b indicating that the information is about the first area. In the area 222a, accuracy 222c of plural pairs of image information is also displayed, and a sufficiency rate of the number of pairs of image information is displayed as a number of pieces of data 222d. The sufficiency rate refers to a rate of the number of pairs of image information actually input through the first image obtaining unit 11 to the necessary number of pairs of image information. The sufficiency rate may be uniformly set for each color area, or may be separately set for each color area. In the present exemplary embodiment, the sufficiency rate is separately set for each color area.

The accuracy 222c is indicated as one of five levels, namely A, B, C, D, and E. A indicates a highest accuracy level, and E indicates lowest accuracy level. The accuracy 222c is provided for "before" and "after". "Before" indicates the accuracy of plural pairs of image information regarding first images, and the level is C here. "After" indicates the accuracy of plural pairs of image information after third images, which are additional images, are added, details of which will be described later, and the level is B here. In other words, the display apparatus 20 displays the accuracy of a color conversion characteristic before and after a new pair of image information (third images) is added.

The number of pieces of data 222d is indicated on a scale of 1 to 5 using solid and hollow boxes. That is, when the number of solid boxes is small, the sufficiency rate of the number of pairs of image information is low, and when the number of solid boxes is large, the sufficiency rate of the number of pairs of image information is high. The number of pieces of data 222d, too, is provided for "before" and "after". "Before" indicates the sufficiency rate of the number of pairs of image information regarding first images, and the sufficiency rate of the number of pieces of data 222d is 3 out of 5 here. "After" indicates the sufficiency rate of the number of pairs of image information after third images, which are additional images, are added, details of which will be described later, and the sufficiency rate of the number of pieces of data 222d is 3 out of 5 here.

In an area 223, information regarding a color area whose accuracy is higher than that of the first area, whose accuracy is low, is displayed. It is assumed here that the accuracy of the seventh area is high.

Information similar to that in the area 222 is displayed in the area 223 for the seventh area. That is, in the area 223, the color of the seventh area is displayed as a color sample 223a, and area information 223b indicating that the information is about the seventh area is displayed. In the area 223, accuracy 223c of plural pairs of image information is also displayed, and a sufficiency rate of pairs of image information is displayed as a number of pieces of data 223d.

The display unit 22 thus displays accuracy for each color area. Here, the first and seventh color areas are selected from among the first to eighth color areas, and the accuracy 222c and 223c is displayed in the areas 222 and 223. The display unit 22 also displays accuracy before and after image information regarding third images for obtaining a pair of image information to be added is obtained. "Before" and "after" indicate the accuracy 222c and 223c in the areas 222 and 223 here.

The display unit 22 also displays a sufficiency rate of pairs of image information necessary to create a color conversion model. The number of pieces of data 222d and 223d is displayed in the areas 222 and 223 as the sufficiency rates of the necessary number of pairs of image information. The display unit 22 also displays a sufficiency rate of pairs of image information before and after image information regarding third images for obtaining a pair of image information to be added is obtained. "Before" and "after" indicate the number of pieces of data 222d and 223d in the areas 222 and 223 here.

In an area 224, the number of pairs of image information obtained is displayed for the first and seventh areas as a number of first images 224a. It is indicated here that the number of first images 224a obtained for the first area is 20 and the number of first images 224a obtained for the seventh area is 100.

In the area 224, degrees of variation in color conversion vectors are also displayed for the first and seventh areas as image uniformity 224b. The image uniformity 224b is indicated on a scale of 5, namely A, B, C, D, and E in descending order. Here, the image uniformity 224b of the first area is B, and the image uniformity 224b of the seventh area is A.

A button 225 is used by the user to input the above-described third images.

In FIG. 2, the second image obtaining unit 14 obtains image information regarding second images used by the user to check accuracy. The second images are images for evaluation used by the user to check accuracy. The second images, as with the first images, are a pair of images before and after color adjustment. The second image obtaining unit 14, as with the first image obtaining unit 11, functions as a reception unit that receives a pair of image information that is image information before and after color adjustment.

The second accuracy evaluation display unit 15 creates, for the second images, display information for displaying an image before color conversion based on a color conversion model and an image after the color conversion. The display unit 22 then displays the images. That is, a temporary color conversion model is created on the basis of a pair of image information obtained by the first image obtaining unit 11, and the display unit 22 displays a result of color adjustment based on the color conversion model as an image after color conversion. The user then looks at the image to check the accuracy.

FIG. 7 is a diagram illustrating a first example in which display information created by the second accuracy evaluation display unit 15 is displayed on the display unit 22 of the display apparatus 20.

In FIG. 7, color areas have certain colors. The certain colors are not particularly limited, and may be set in accordance with the user's purposes. In this case, the color areas need not cover the entirety of a color space used, that is, the color areas may cover only a part of the color space. When color adjustment is performed only for beige, for example, a color area may be beige. When color adjustment is performed only for a metal part, for example, a color area may have a metal color. It is needless to say that plural color areas may be set. In FIG. 7, six color areas in red, white, gray, beige, blue, and yellow are set as an example.

In the present exemplary embodiment, the second accuracy evaluation display unit 15 calculates accuracy for each color area.

In the example illustrated in FIG. 7, a color area for which images are displayed to check accuracy in a whole color area is displayed in a left area RL. In an area 226, a color in the grey color area is displayed as a color sample 226a, and "area: gray" is displayed as area information 226b indicating that the information is about the gray color area. In the area 226, accuracy 226c of plural pairs of image information is also displayed, and a sufficiency rate of pairs of image information is displayed as a number of pieces of data 226d.

As in FIG. 6, the accuracy 226c is indicated as a level and provided for "before" and "after". Here, both levels are C. As in FIG. 6, the number of pieces of data 226d is indicated on a scale of 1 to 5 using solid and hollow boxes and provided for "before" and "after". "Before" indicates that the sufficiency rate is 3 out of 5, and "after" indicates that the sufficiency rate is 5 out of 5.

In area 227, the accuracy of an area whose accuracy is high is displayed for the sake of comparison. Here, a color in the red area is displayed as a color sample 227a, and "area: red" is displayed as area information 227b indicating that the information is about the red area. Accuracy 227c indicates that a level in the red area is A. A number of pieces of data 227d indicates that a sufficiency rate is 5 out of 5.

The button 225 having the same function as in FIG. 6 is also displayed in the left area RL.

In the example illustrated in FIG. 7, images used by the user to check the accuracy of the gray color area are displayed in an area 228 of a right area RR. Here, a second image before color adjustment obtained by the second image obtaining unit 14 is displayed as a "before correction" image 228a. In addition, a second image after the color adjustment obtained by the second image obtaining unit 14 is displayed as a "target" image 228c. A result of color adjustment based on the temporary color conversion model is displayed between the images 228a and 228c as an "automatic correction" image 228b.

In an area 229 of the right area RR, images used by the user to check the accuracy of the red area are displayed. The images displayed in the area 229 are displayed using the same method as in the area 228. That is, a second image before color adjustment obtained by the second image obtaining unit 14 is displayed as a "before correction" image 229a. In addition, a second image after the color adjustment obtained by the second image obtaining unit 14 is displayed as a target image 229c. A result of color adjustment based on the temporary color conversion model is displayed between the images 229a and 229c as an "automatic correction" image 229b.

The user can identify the accuracy of the temporary color conversion model by comparing the images 228b and 228c in the area 228. The user can also identify the accuracy by comparing the images 229b and 229c in the area 229. In the area 228, however, the comparison is performed with low accuracy, and in the area 229, the comparison is performed with high accuracy. The user, therefore, can compare these two cases by comparing the areas 228 and 229.

Since the accuracy of the temporary color conversion model and the accuracy of plural pairs of image information are related to each other, these images can be seen as indicators of the accuracy of plural pairs of image information.

Although the second images are a pair of images before and after color adjustment, only an image before color adjustment may be used, instead. In this case, the "target" images 228c and 229c after color adjustment are not displayed. In this case, the images 228a and 228b in the area 228 and the images 229a and 229b in the area 229 are compared with each other to identify the accuracy of the temporary color conversion model.

FIG. 8A is a diagram illustrating a second example in which the display information created by the second accuracy evaluation display unit 15 is displayed in the display unit 22 of the display apparatus 20.

In the example illustrated in FIG. 8A, the same image as in the area 226 illustrated in FIG. 7 is displayed in the area 226 of a left area RL. That is, the color sample 226a, the area information 226b, the accuracy 226c, and the number of pieces of data 226d are displayed for the grey color area.

In the left area RL, the button 225 having the same function as in FIG. 7 is displayed.

In an area 230 of a right area RR, images used by the user to check the accuracy of the gray color area are displayed. As in FIG. 7, an image before color adjustment is displayed as a "before correction" image 230a. A result of color adjustment performed before third images are added is displayed as a "first learning" image 230b, and a result of color adjustment performed after the third images are added is displayed as a "second learning" image 230c. That is, the images 230b and 230c can be seen as images corresponding to "before" and "after" of the accuracy 226c.

Although the images in the areas 227 and 229 illustrated in FIG. 7 are not displayed here, the images may be displayed in FIG. 8A, instead. In addition, the images displayed in the areas 228 and 229 illustrated in FIG. 7 and the areas 230 and 232 illustrated in FIG. 8 may be replaced by figures (or solid figures) of RGB values in the color space, instead.

FIG. 8B is a diagram illustrating a third example in which the displayed information created by the second accuracy evaluation display unit 15 is displayed on the display unit 22 of the display apparatus 20.

In the example illustrated in FIG. 8B, images used by the user to check the accuracy of the whole color area are displayed. Here, in an area 231 of a left area RL, accuracy 231c and a number of pieces of data 231d are displayed.

The accuracy 231c is indicated as one of five levels, namely A, B, C, D, and E. Two sets of third images, which are additional images, are prepared here, and the accuracy 231c when these sets are named "first learning" and "second learning" is indicated. In this case, an accuracy level of the first learning is A, and an accuracy level of the second learning is C.

As in FIG. 7, the number of pieces of data 231d is indicated on a scale of 1 to 5 using solid and hollow boxes and provided for "first learning" and "second learning". A sufficiency rate of the first learning is 4 out of 5, and a sufficiency rate of the second learning is 5 out of 5.

In addition, images used by the user to check the accuracy of the whole color area are displayed in the area 232 of a right area RR. As in FIG. 8A, an image before color adjustment is displayed as a "before correction" image 232a. In addition, a "first learning" image 232b and a "second learning" image 232c are displayed as images used by the user to check the accuracy of the two sets of third images. That is, the images 230b and 230c can be seen to correspond to "first learning" and "second learning" of the accuracy 231c. In addition, a "target" image 232d after the color adjustment is displayed, and it can be determined which of the "first learning" image 232b and the "second learning" image 232c is closer to the "target" image 232d. Furthermore, as a result of the comparison, the user can select either "first learning" or "second learning" as learning to be used.

A button 233 is used by the user to select either "first learning" or "second learning".

FIG. 9 is a diagram illustrating a fourth example in which the display information created by the second accuracy evaluation display unit 15 is displayed on the display unit 22 of the display apparatus 20.

Here, a case is illustrated in which accuracy levels are displayed as a list for red, white, gray, beige, blue, and yellow, which have been set as color areas.

In a left area RL, colors of the color areas are displayed as color samples 234a and area information 234b.

In a right area RR, accuracy 234c is displayed. The accuracy 234c is indicated as one of five levels, namely 1, 2, 3, 4, and 5, without using boxes here. 5 indicates a highest accuracy level, and 1 indicates a lowest accuracy level. Levels before third images are added are indicated as "learning (initial)", and levels after the third images are added are indicated as "relearning".

The first accuracy evaluation display unit 13 and the second accuracy evaluation display unit 15 can be regarded as display information creation units that create display information for displaying the accuracy of plural pairs of image information when a color conversion model for converting image information regarding an image before color conversion into image information regarding an image after the color conversion is created. The first accuracy evaluation display unit 13 and the second accuracy evaluation display unit 15 can also be regarded as display control units that display accuracy output from the image information obtaining unit 12 on the display apparatus 20 for each color area. The second accuracy evaluation display unit 15 can also be regarded as a display control unit that, when the second image obtaining unit 14 has received a new pair of image information (second images), displays, on the display apparatus 20, at least image information obtained by performing color conversion on image information before the color conversion regarding the new pair of image information (second images) on the basis of a color conversion characteristic (color conversion model) created by the color conversion coefficient calculation unit 19 from a pair of image information that has already been received by the first image obtaining unit 11 and image information after the color conversion regarding the pair of image information (second images).

The user evaluation reception unit 16 receives the user's evaluation of color conversion based on a color conversion model after the display unit 22 displays images on the basis of display information regarding second images.

That is, the user looks at the images in the areas 228 and 229 illustrated in FIG. 7 and inputs, to the user evaluation reception unit 16, his/her evaluation as to whether to accept accuracy obtained using the above-described temporary color conversion model. The display unit 22 displays a user evaluation reception screen for receiving the user's evaluation of color conversion based on a color conversion model as a result of the display of the second images.

Figure 10:
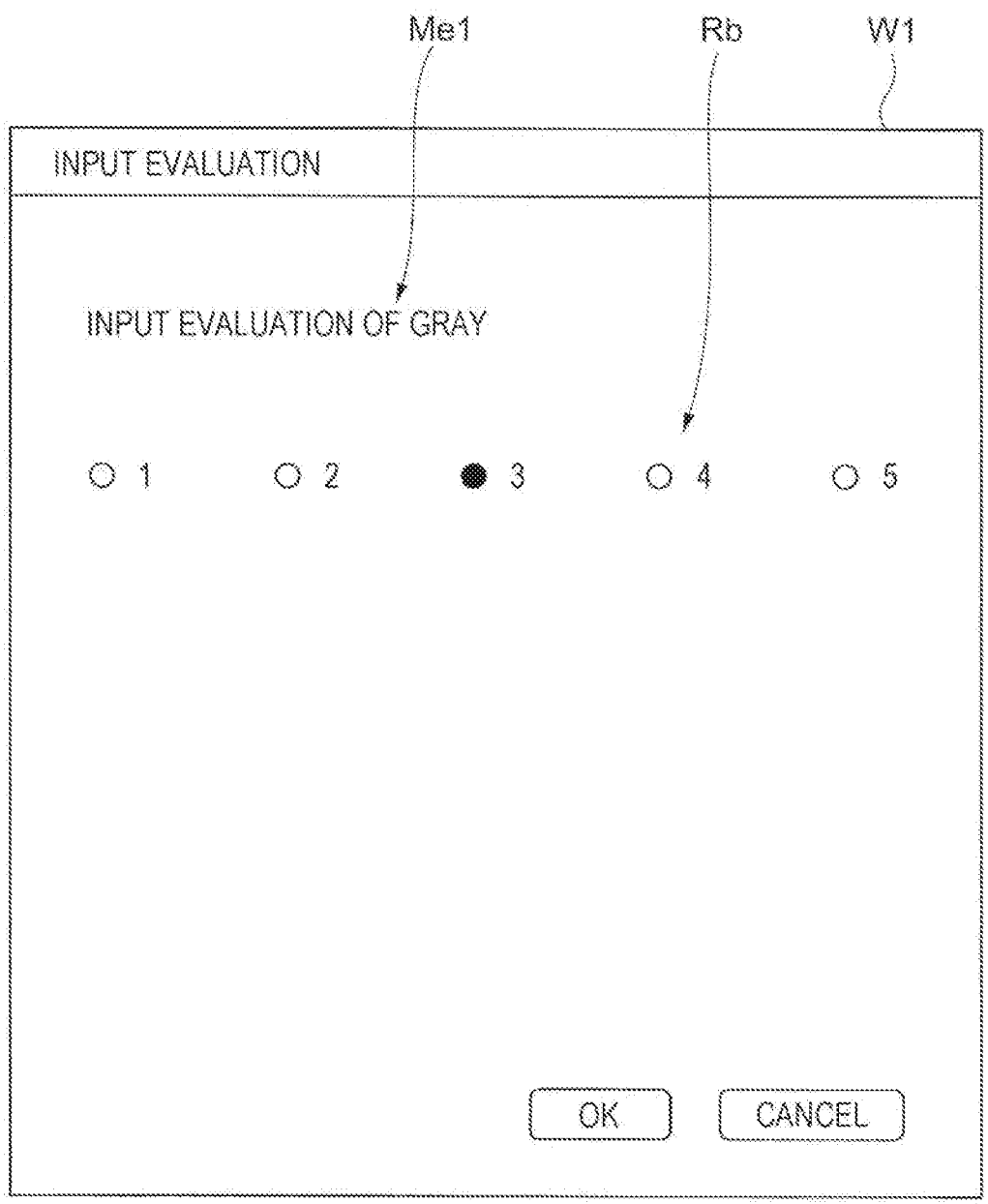
FIG. 10 is a diagram illustrating an example in which a user evaluation reception screen is displayed on the display unit.

FIG. 10 is a diagram illustrating an example in which the display unit 22 displays the user evaluation reception screen.

In the example illustrated in FIG. 10, the display unit 22 displays the user evaluation reception screen as a window W1. Here, the user inputs his/her evaluation of the gray color area illustrated in FIG. 7. That is, the user compares the images 228a to 228c in the area 228 illustrated in FIG. 7 and inputs his/her evaluation. A message Me1, which is "Input evaluation of gray", is displayed in the window W1. The user inputs his/her evaluation on a scale of 1 to 5. 1 is a lowest evaluation score, and 5 is a highest evaluation score. The user then selects one of radio buttons Rb next to the numbers 1 to 5 to input his/her evaluation. In this example, the user selects the radio button Rb corresponding to 3.

Although the user inputs his/her evaluation on a scale of 1 to 5 in FIG. 10, the scale used is not particularly limited to this. For example, the user may select his/her evaluation between "satisfactory" and "unsatisfactory". Although the user inputs his/her evaluation of the gray color area here, the user may input his/her evaluation of another color area, instead. The user may also input second images and evaluate each of the second images. The user may also identify color areas included in the second images, determine a representative image from the second images for each color area, display the representative images in the areas 228 and 229 illustrated in FIG. 7, and input his/her evaluation on the basis of the displayed representative images.

As illustrated in FIGS. 8A and 8B, the user may input his/her evaluation by selecting one of images for checking the accuracy of plural sets of third images. The screen illustrated in FIGS. 8A and 8B, therefore, can be regarded as the user evaluation reception screen.

The additional information obtaining unit 17 obtains a color area required for a pair of image information to be added when the number of pairs of image information is insufficient. That is, the additional information obtaining unit 17 obtains a color area required for third images, which are a pair of images before and after color adjustment. At this time, the additional information obtaining unit 17 creates display information for displaying an additional information screen in which a color area required for a pair of image information to be added is displayed. The display unit 22 then displays the additional information screen.

The additional information obtaining unit 17 can also obtain the number of pairs needed as third images. In this case, the display unit 22 displays the number of pairs needed as third images.

Figure 11:
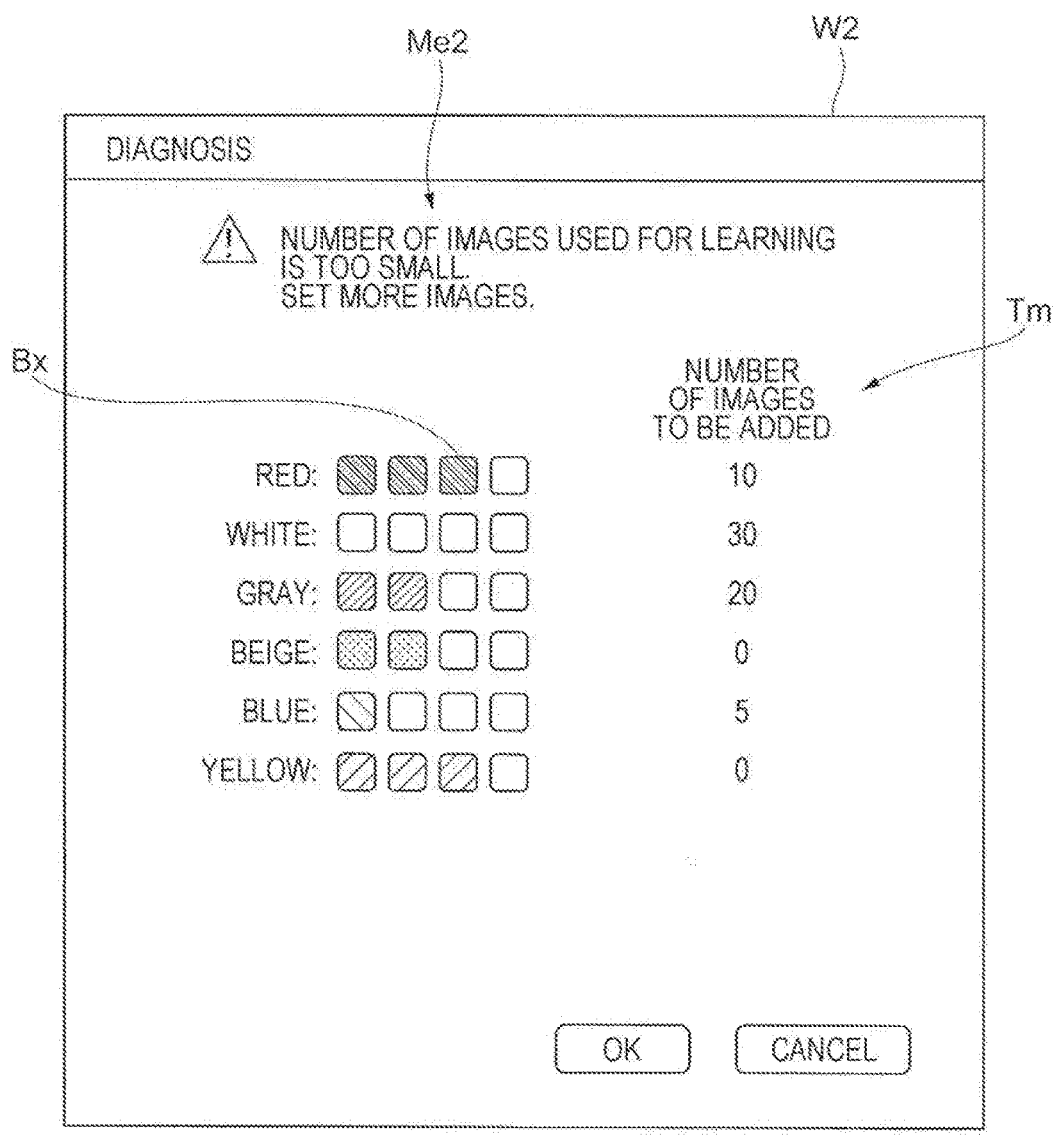
FIG. 11 is a diagram illustrating an example in which an additional information screen is displayed on the display unit.

FIG. 11 is a diagram illustrating an example in which the display unit 22 displays the additional information screen.

In the example illustrated in FIG. 11, the display unit 22 displays the additional information screen as a window W2. A message Me2, which is "Number of images used for learning is too small. Set more images", is displayed in the window W2.

In the window W2, sufficiency rates are also displayed for color areas on a scale of 1 to 4 using solid and hollow boxes Bx. That is, when the number of solid boxes Bx is small, the sufficiency rate of the number of pairs of image information is low, and when the number of solid boxes Bx is large, the sufficiency rate of the number of pairs of image information is high. The number of pairs to be added Tm is also displayed in the window W2 for each color area.

The number of pairs necessary for each color area may be set in advance, and the number of pairs to be added Tm can be obtained by subtracting the number of pairs of first images that have been actually input from the number of pairs necessary for each color area. Alternatively, the number of pairs to be added Tm may be adjusted on the basis of accuracy or the user's evaluation, not just by performing subtraction. That is, if accuracy is high, the number of pairs to be added Tm is decreased. If accuracy is low, the number of pairs to be added Tm is increased. If the user's evaluation is high, the number of pairs to be added is decreased. If the user's evaluation is low, the number of pairs to be added Tm is increased.

Here, the boxes Bx and the number of pairs to be added Tm are displayed for the six color areas of red, white, gray, beige, blue, and yellow. The number of pairs of image information is sufficient for the red and blue color areas, and the number of pairs to be added Tm is 0. The number of pairs of image information is insufficient for the other color areas, and the number of pairs to be added Tm is indicated. As for the gray color area, for example, the number of pairs to be added Tm is 30. The user can look at the additional information screen to see whether third images, which are additional images, are necessary. The user can also identify a color area for which the number of pairs of image information is insufficient. For example, the user can select an image that includes a large amount of a color of the color area and use the image as a third image.

The third image obtaining unit 18 obtains image information regarding third images. The third image obtaining unit 18, as with the first image obtaining unit 11 and the second image obtaining unit 14, functions as a reception unit that receives a pair of image information including image information before and after color conversion.

As a result, if the user's evaluation received by the user evaluation reception unit 16 is equal to or lower than a predetermined threshold, for example, a pair of image information can be obtained. At this time, the display unit 22 displays a third image obtaining screen for obtaining image information regarding third images.

The screens illustrated in FIGS. 6 and 7, which display the button 225 selected by the user to input third images, are examples of the third image obtaining screen. Another window for obtaining third images may be displayed, instead.

Image information regarding third images is subjected to the same processing as for image information regarding first images. That is, the area determination section 121 of the image information obtaining unit 12 determines an area in which image information is to be extracted, and the image information extraction section 122 extracts a pair of image information. The image information storage section 123 stores the extracted pair of image information, and the accuracy calculation section 124 calculates the accuracy of plural pairs of image information. The accuracy of the plural pairs of image information is calculated on the basis of the image information regarding first images and third images. The calculated accuracy is displayed as "after" illustrated in FIG. 6 or 7.

The color conversion coefficient calculation unit 19 creates a color conversion model. The color conversion coefficient calculation unit 19, therefore, functions as a color conversion characteristic creation unit that creates a color conversion characteristic (color conversion model) from plural pairs of image information received by the first image obtaining unit 11. The color conversion coefficient calculation unit 19 also creates a conversion relationship such as a three-dimensional LUT on the basis of the color conversion model.

The color conversion coefficient calculation unit 19 creates a color conversion model on the basis of pairs of image information before and after color adjustment obtained from first and third images. That is, The color conversion coefficient calculation unit 19 creates a color conversion model indicating a relationship between image information before color adjustment and image information after color adjustment.

Figure 12:
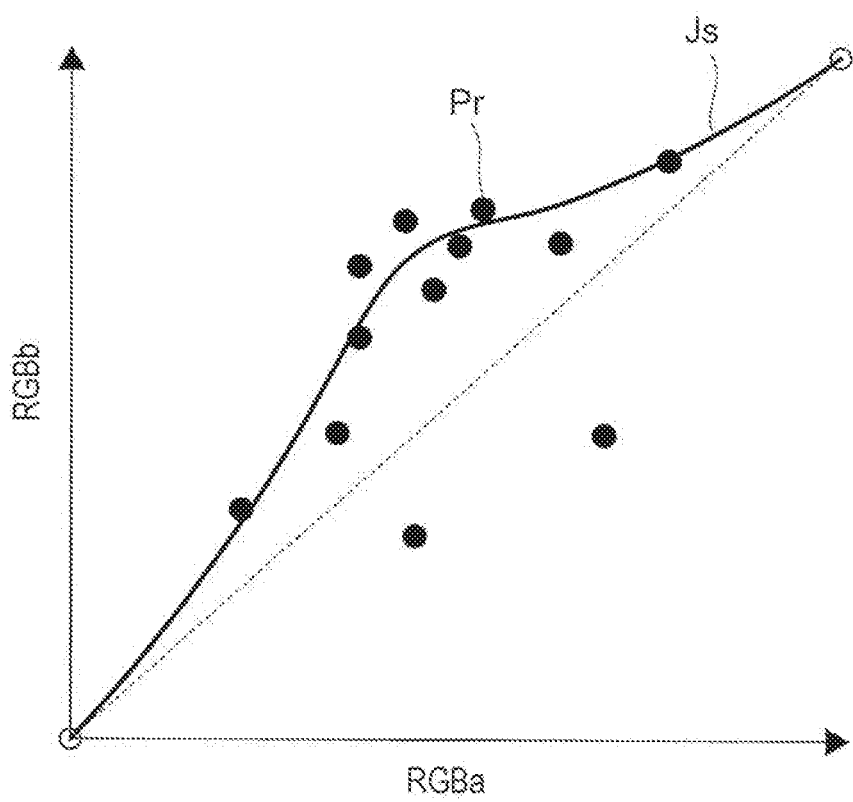
FIG. 12 is a diagram illustrating an example of a color conversion model.

FIG. 12 is a diagram illustrating an example of a color conversion model.

A horizontal axis represents image information before color adjustment, and a vertical axis represents image information after color adjustment. The image information before and after color adjustment is RGB data. In FIG. 12, the image information before color adjustment is denoted by RGBa, and the image information after color adjustment is denoted by RBGb.

Solid circles Pr indicate the image information before and after color adjustment. Here, there are twelve pairs of image information before and after color adjustment.

A curve Js indicates a relationship between the image information before color adjustment and the image information after color adjustment and is a color conversion mode created by the color conversion coefficient calculation unit 19. As described above, a color conversion model can be regarded as a function representing a relationship between image information before color adjustment and image information after color adjustment. If the function is denoted by f, RGBb=f (RGBa). The color conversion model may be created using a known method. It is desirable, however, to use a method having high fitting performance against nonlinear characteristics of a weighted regression model, a neural network, or the like. Alternatively, linear characteristics based on a matrix model may be used.

Modification

Next, a modification of the present exemplary embodiment will be described.

Figure 13:
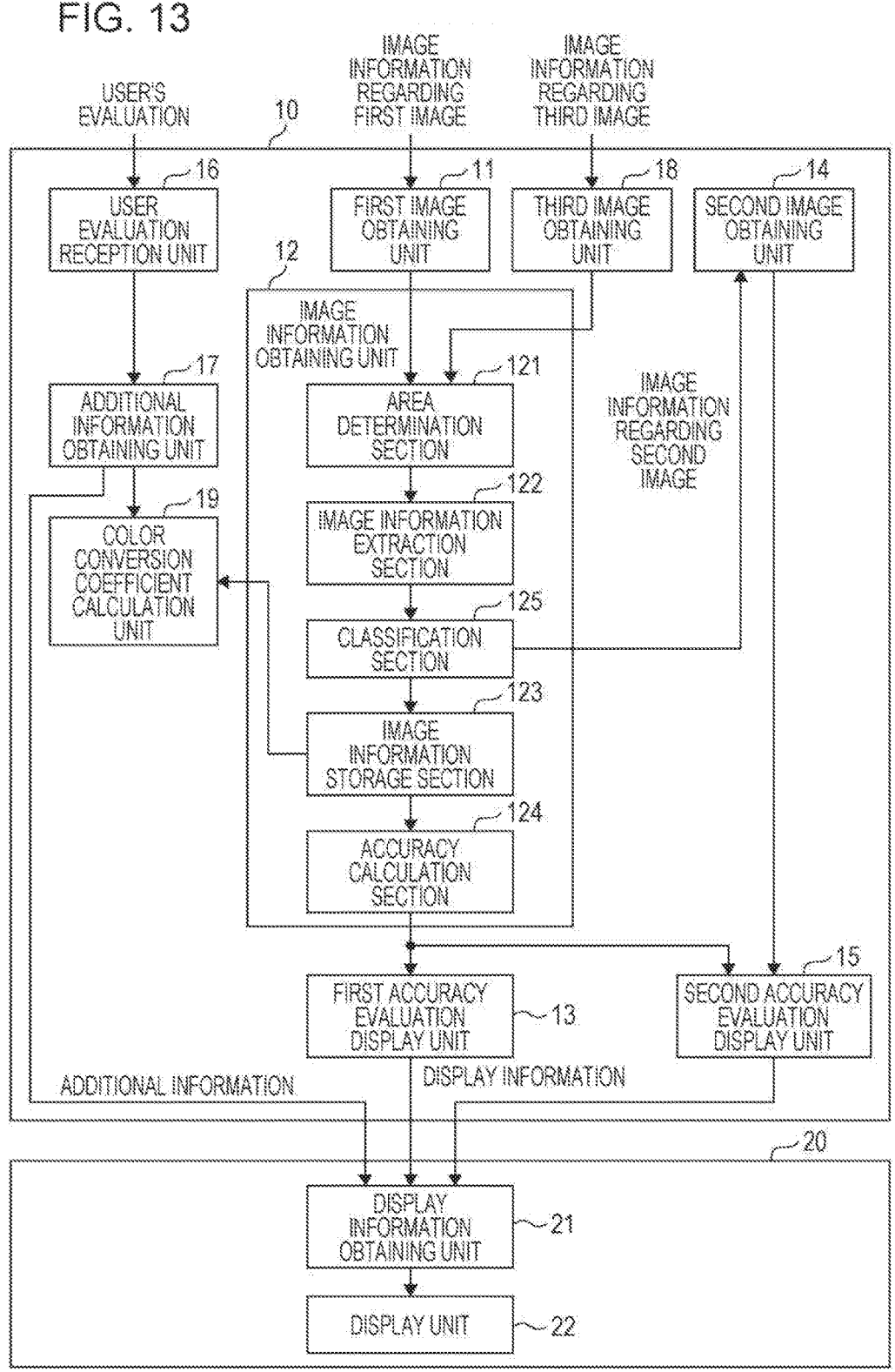
FIG. 13 is a block diagram illustrating the functional configuration of an image processing apparatus and a display apparatus according to a modification of the exemplary embodiment.

FIG. 13 is a block diagram illustrating the functional configuration of an image processing apparatus 10 and a display apparatus 20 according to the modification of the present exemplary embodiment. FIG. 13 illustrates only functions of the image processing apparatus 10 and the display apparatus 20 relevant to the modification of the present exemplary embodiment.

In the image processing apparatus 10 and the display apparatus 20 according to the modification of the present exemplary embodiment illustrated in FIG. 13, a classification section 125 is added to the image information obtaining unit 12 illustrated in FIG. 2. The second image obtaining unit 14 obtains image information regarding second images from the classification section 125. Other components are the same as those illustrated in FIG. 2. Functions of the components other than the classification section 125 are the same as the functions of the corresponding components illustrated in FIG. 2. The classification section 125, therefore, will be mainly described hereinafter.

The classification section 125 classifies pairs of image information extracted by the image information extraction section 122 into learning data and non-learning data. The learning data refers to pairs of image information used to create a color conversion model. The non-learning data refers to pairs of image information that are not used to create a color conversion model. The second accuracy evaluation display unit 15 determines the non-learning data as image information regarding second images used by the user to check accuracy. That is, the image processing apparatus 10 illustrated in FIG. 13 obtains image information regarding second images for evaluation from image information regarding first images.

Pairs of image information are classified into learning data and non-learning data by a certain ratio for each color area. A ratio of learning data to non-learning data is predetermined as 4:1 or 9:1, for example, and pairs of image information are randomly classified into learning data and non-learning data in accordance with the ratio.

In this case, the user need not input image information regarding second images, which reduces the user's burden.

Next, operations performed by the image processing apparatus 10 will be described.

First Exemplary Embodiment

In a first exemplary embodiment, an operation performed by the image processing apparatus 10 that displays the screen illustrated in FIG. 7 will be described as a first example of minimum configuration.

Figure 14:
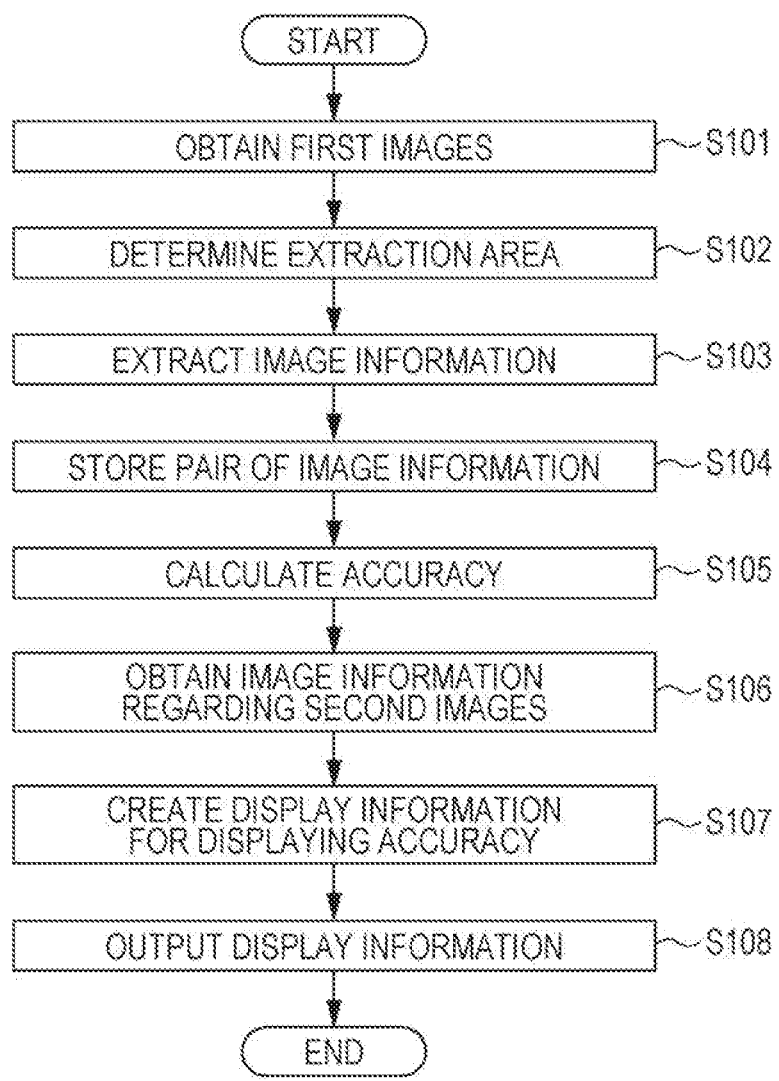
FIG. 14 is a flowchart illustrating an operation performed by the image processing apparatus according to a first exemplary embodiment.

FIG. 14 is a flowchart illustrating the operation performed by the image processing apparatus 10 according to the first exemplary embodiment.

First, the first image obtaining unit 11 obtains image information regarding an original image before color adjustment and image information after the color adjustment as first images (step 101: a step of obtaining first images and a reception step).

Next, the area determination section 121 of the image information obtaining unit 12 determines an area in which image information is to be extracted for either the image before color adjustment or the image after color adjustment (step 102: a step of determining an extraction area).

The image information extraction section 122 extracts image information in the area of the image before the color adjustment or the image after the color adjustment determined by the area determination section 121 and an area of the other image corresponding to the determined area (step 103: a step of extracting image information).

The image information storage section 123 stores an extracted pair of image information (step 104: a step of storing image information).

Steps 102 to 104 can be seen as a step of obtaining image information before color conversion and image information after the color conversion corresponding to the image information before the color conversion as a pair of image information. Step 102 may be omitted. When step 102 is omitted, image information is extracted from the entirety of the images.

Next, the accuracy calculation section 124 calculates the accuracy of extracted plural pairs of image information (step 105: a step of calculating accuracy and a step of outputting accuracy). That is, as described with reference to FIG. 5, accuracy is calculated from an angle between color conversion vectors or a color difference between final points. The accuracy calculation section 124 calculates accuracy for each color area illustrated in FIG. 7. At this time, as described above, the image information obtaining unit 12 may exclude a color conversion vector whose angle or color difference is greatly different from those of other color conversion vector.

The second image obtaining unit 14 obtains image information regarding second images for evaluation (step 106: a step of obtaining second images and a reception step).

The second accuracy evaluation display unit 15 creates display information for displaying the calculated accuracy (step 107: a step of creating display information). More specifically, the second accuracy evaluation display unit 15 creates display information for displaying the screen illustrated in FIG. 7.

The second accuracy evaluation display unit 15 outputs the created display information to the display apparatus 20 (step 108: a step of outputting display information and a display control step).

As a result, the display unit 22 of the display apparatus 20 displays the screen illustrated in FIG. 7.

Second Exemplary Embodiment

In a second exemplary embodiment, an operation performed the image processing apparatus 10 according to the modification will be described as a second example of minimum configuration.

Figure 15:
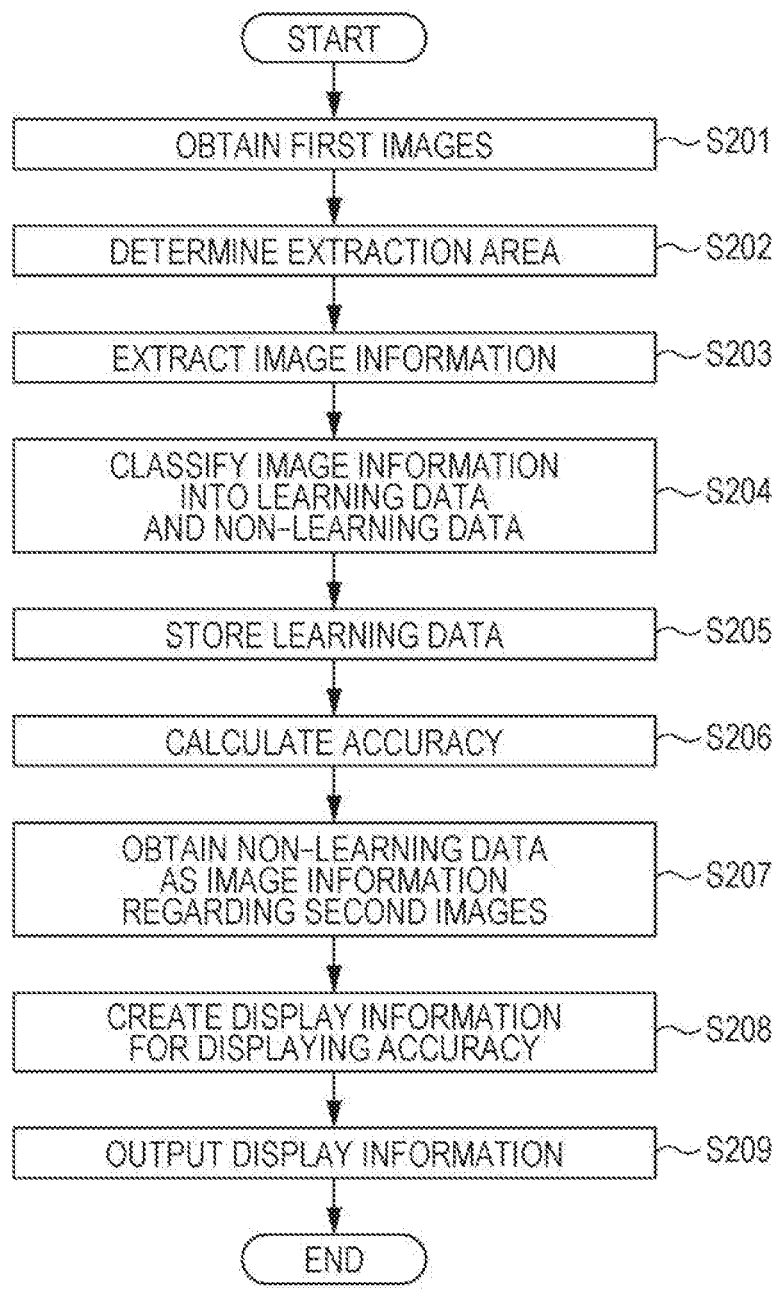
FIG. 15 is a flowchart illustrating an operation performed by the image processing apparatus according to a second exemplary embodiment.

FIG. 15 is a flowchart illustrating the operation performed by the image processing apparatus 10 according to the second exemplary embodiment.

In FIG. 15, steps 201 to 203 are the same as steps 101 to 103, and description thereof is omitted.

After step 203, the classification section 125 classifies pairs of image information extracted by the image information extraction section 122 into learning data and non-learning data (step 204).

The image information storage section 123 stores learning data (step 205: a step of storing learning data).

Steps 202 to 205 can be seen as a step of obtaining image information before color conversion and image information after the color conversion as a pair of image information.

Next, the accuracy calculation section 124 calculates the accuracy of extracted plural pairs of image information (step 206: a step of calculating accuracy and a step of outputting accuracy).

The second image obtaining unit 14 then obtains non-learning data as image information regarding second images for evaluation (step 207: a step of obtaining second images and a reception step).

Steps 208 and 209 are the same as steps 107 and 108, and description thereof is omitted.

Third Exemplary Embodiment

In a third exemplary embodiment, a case will be described in which, in addition to the first exemplary embodiment, the user's evaluation is received, image information regarding third images, which are additional images, are obtained, and a conversion relationship is created.

Figure 16:
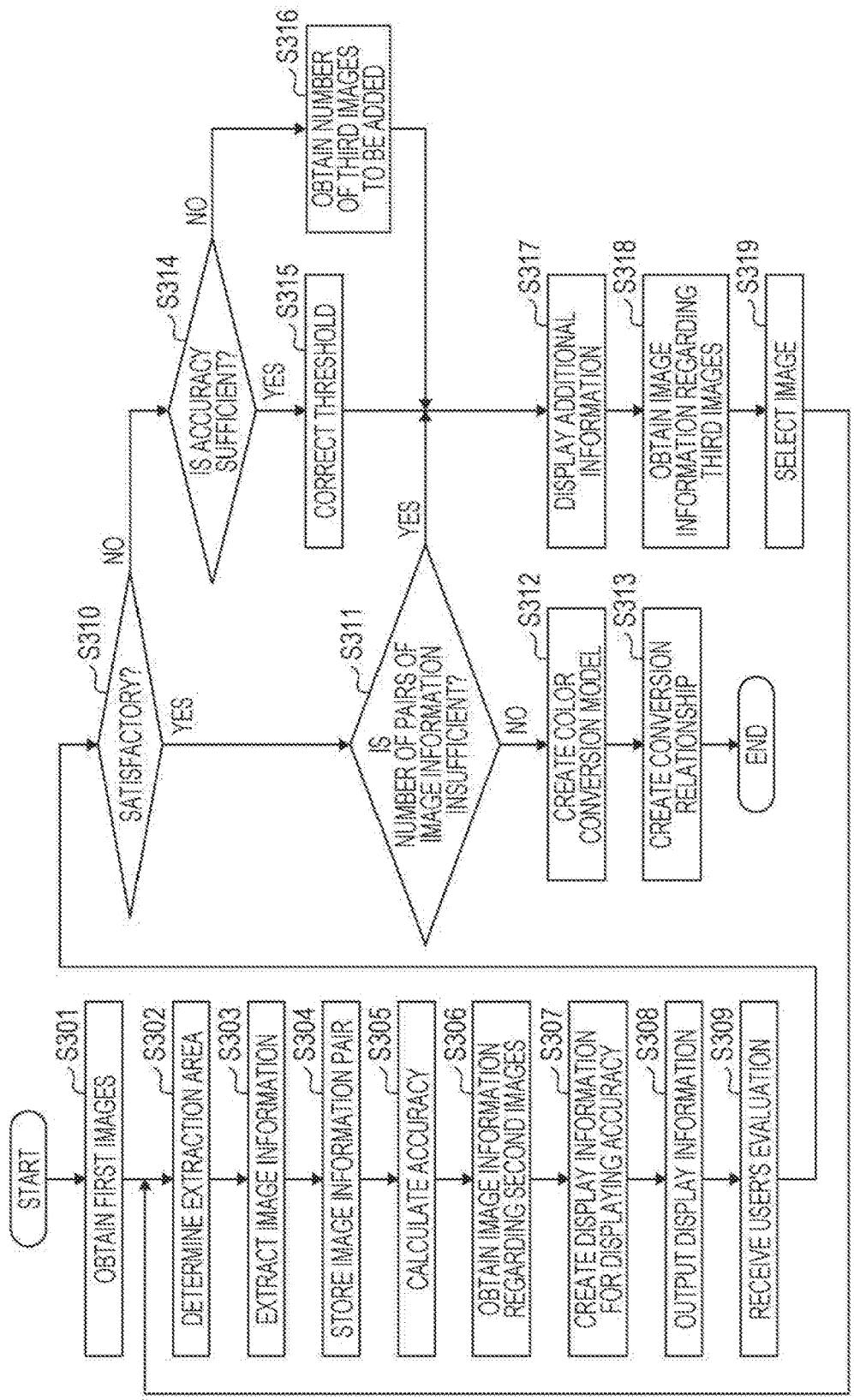
FIG. 16 is a flowchart illustrating an operation performed by the image processing apparatus according to a third exemplary embodiment.

FIG. 16 is a flowchart illustrating an operation performed by the image processing apparatus 10 according to the third exemplary embodiment.

In FIG. 16, steps 301 to 308 are the same as steps 101 to 108, and description thereof is omitted.

After step 308, the user looks at the screen illustrated in FIG. 7 and, for example, inputs his/her evaluation to the user evaluation reception screen illustrated in FIG. 8. The user evaluation reception unit 16 receives the user's evaluation (step 309: a step of receiving a user's evaluation). The user selects "satisfactory" or "unsatisfactory" here as his/her evaluation.

Next, the user evaluation reception unit 16 determines whether the user's evaluation is "satisfactory" (step 310: a step of determining evaluation).

If the user's evaluation is "satisfactory" (YES in step 310), the additional information obtaining unit 17 determines whether the number of pairs of image information obtained is insufficient (step 311: a step of determining insufficiency).

If the number of pairs of image information obtained is not insufficient (NO in step 311), the color conversion coefficient calculation unit 19 creates a color conversion model (step 312: a step of creating a color conversion model and a step of creating a color conversion characteristic). The color conversion coefficient calculation unit 19 also creates a conversion relationship such as a three-dimensional LUT on the basis of the color conversion model (step 313: a step of creating a conversion relationship).

That is, in the present exemplary embodiment, if the user's evaluation received by the user evaluation reception unit 16 exceeds a predetermined threshold (the user's evaluation is "satisfactory" in this case) and the number of pairs of image information is sufficient, a color conversion model is created.

If the number of pairs of image information obtained is insufficient in step 311 (YES in step 311), the operation proceeds to step 317.

If the user's evaluation is "unsatisfactory" in step 310 (NO in step 310), the additional information obtaining unit 17 determines whether the accuracy calculated in step 305 is sufficient (step 314: a step of determining accuracy). The additional information obtaining unit 17 provides a predetermined threshold for accuracy and determines on the basis of the threshold whether the accuracy is sufficient.

If the accuracy is sufficient (YES in step 314), the threshold is corrected (step 315: a step of correcting a threshold). That is, in this case, the user's evaluation is "unsatisfactory" even though the accuracy is sufficient, which means that the accuracy is still too low for the user. The threshold, therefore, is corrected such that a higher accuracy level can be achieved (the threshold becomes stricter).

If the accuracy is not sufficient (NO in step 314), the additional information obtaining unit 17 identifies a color area required for image information to be added with third images and calculates the number of pairs of third images to be added (step 316: a step of calculating the number of pairs to be added).

Next, the additional information obtaining unit 17 creates the display information regarding the additional information screen illustrated in FIG. 11 and causes the display unit 22 to display the additional information screen (step 317: a step of displaying additional information). The user is thus prompted to input third images.

That is, in the present exemplary embodiment, if the user's evaluation received by the user evaluation reception unit 16 is equal to or lower than a predetermined threshold (the user's evaluation is "unsatisfactory" in this case), image information regarding third images is obtained.

If the user's evaluation received by the user evaluation reception unit 16 exceeds the predetermined threshold (the user's evaluation is "satisfactory" in this case) but the number of pairs of image information is insufficient (NO in step 311), image information regarding third images is obtained.

The user inputs third images, and the third image obtaining unit 18 obtains image information regarding the third images (step 318: a step of obtaining third images and a reception step).

The image information obtaining unit 12 then selects images to be used from the first images obtained in step 301 and third images obtained in step 318 (step 319: a step of selecting images). The operation then returns to step 302.

According to the first and second exemplary embodiments, the accuracy of plural pairs of image information regarding first images input by the user is displayed for each color area, and a color conversion model created on the basis of the first images can be quantitatively evaluated on the basis of the accuracy. The user can determine whether to add images on the basis of the evaluation. In addition, the user can identify a color area for which images need to be added. That is, if the accuracy is low, the user can identify a problem.

According to the third exemplary embodiment, the user who has looked at information regarding accuracy can perform evaluation, and the image processing apparatus 10 can determine whether to add third images in accordance with the user's evaluation. At this time, a color area required for third images and the number of pairs to be added can be presented to the user. In addition, it becomes easier for the user to identify problematic input images by taking a look at accuracy after third images are added. That is, if the accuracy does not improve even after the number of images is increased, there are a large number of images whose directivity of color adjustment is different. In addition, if the accuracy of a certain color area does not improve even after the number of images is increased, the number of images including a color of the color area is insufficient.

As a result, necessary images can be secured for each color area, and an accurate color conversion model can be created. Furthermore, a conversion relationship created from the color conversion model becomes accurate.

Although the screen illustrated in FIG. 7 is displayed in the first to third exemplary embodiments, the screen illustrated in FIG. 6, 8A, 8B, or 9 can be displayed. In this case, too, the user can look at accuracy to determine whether to add images or input his/her evaluation.

Although images before color adjustment are images captured by the camera 40 in the above examples, the type of images before color adjustment is not limited to this. Any type of images may be used.

In addition, in FIGS. 6 and 7, the "after" part need not be displayed before third images are added. The "after" part may be displayed in gray before third images are added, and may be displayed normally after the third images are added.

The above-described process performed by the image processing apparatus 10 can be seen as a method for processing images. That is, the process performed by the image processing apparatus 10 can be seen as a method for processing images including at least the following two steps (I) and (II).

(I) A step of obtaining image information before color conversion and image information after the color conversion as a pair of image information regarding first images, which include an image before color conversion and an image after the color conversion (II) A step of creating display information for displaying the accuracy of plural pairs of image information for converting the image information regarding the first image before the color conversion obtained in the step of obtaining image information into the image information regarding the first image after the color conversion The process performed by the display apparatus 20 can also be seen as a method for displaying images. That is, the process performed by the display apparatus 20 can be seen as a method for displaying images including at least the following two steps (III) and (IV).

(III) A step of obtaining, when a color conversion characteristic for converting image information regarding an image before color conversion into image information regarding an image after the color conversion is to be created, display information for displaying the accuracy of a pair of image information before color conversion and image information after the color conversion for each color area of first images, which include an image before color conversion and an image after the color conversion (IV) A step of displaying accuracy on the basis of the display information Program The process performed by the image processing apparatus 10 according to one of the above-described exemplary embodiments is prepared as a program such as application software.

The process performed by the image processing apparatus 10 according to one of the exemplary embodiments, therefore, can be seen as a program for causing a computer to perform a function of receiving a pair of image information including image information before and after color conversion, a function of outputting the accuracy of a color conversion characteristic from plural pairs of image information received using the function of receiving a pair of image information, a function of creating a color conversion characteristic from the plural pairs of image information received using the function of receiving a pair of image information, a function of displaying, after a new pair of image information is received using the function of receiving a pair of image information, at least image information obtained by performing color conversion on image information before color conversion in the new pair of image information on the basis of the color conversion characteristic created, using the function of creating a color conversion characteristic, from the pair of image information already received using the function of receiving a pair of image information and image information after color conversion in the new pair of image information on a display apparatus.

The process performed by the image processing apparatus 10 according to one of the exemplary embodiments can also be seen as a program for causing a computer to perform a function of receiving a pair of image information including image information before and after color conversion, a function of outputting the accuracy of a color conversion characteristic from plural pairs of image information received using the function of receiving a pair of image information, and a function of displaying the accuracy output using the function of outputting the accuracy on a display apparatus for each color area.

A program that implements one of the exemplary embodiments may be provided through a communication unit or may be stored in a recording medium such as a compact disc read-only memory (CD-ROM) and provided.

Although the exemplary embodiments have been described above, the technical scope of the present invention is not limited by the exemplary embodiments. It can be seen from the claims that modes obtained by modifying or altering the exemplary embodiments in various ways are also included in the technical scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
at least one hardware processor configured to implement:
a reception unit that receives a pair of image information including image information before color conversion and image information after the color conversion;
an accuracy output unit that outputs an indication of an accuracy level of a color conversion characteristic from a plurality of pairs of image information received by the reception unit; and
a display control unit that controls a display apparatus to display the indication of the accuracy level output from the accuracy output unit for color areas.

2. The image processing apparatus according to claim 1, wherein the display control unit controls the display apparatus to display the indication of the accuracy level of the color conversion characteristic before and after a new pair of image information is added.

3. The image processing apparatus according to claim 1, wherein the display control unit controls the display apparatus to display the indication of the accuracy level as a circle representing the color areas by combining accuracy levels displayed for the color areas.

4. The image processing apparatus according to claim 1, wherein, if a user's evaluation received in a user evaluation reception screen is equal to or lower than a predetermined threshold, the display control unit controls the display apparatus to display an image for receiving other pairs of image information.

5. The image processing apparatus according to claim 4, wherein the display control unit controls the display apparatus to display a color area required for the other pairs of image information to be received.

6. The image processing apparatus according to claim 4, wherein the display control unit controls the display apparatus to display a number of pairs of image information to be received.

7. The image processing apparatus according to claim 1, wherein the display control unit controls the display apparatus to display a sufficiency rate of a number of pairs of image information necessary to create the color conversion characteristic.

8. The image processing apparatus according to claim 7, wherein the display control unit controls the display apparatus to display sufficiency rates of the number of pairs of image information before and after a pair of image information is obtained.

9. The image processing apparatus according to claim 1, wherein the indication of the accuracy is displayed alongside a sufficiency rate of the plurality of pairs of image information, and
wherein the sufficiency rate comprises an indication of a number of the plurality of pairs of image information compared to a preset number respective to a color area of the image.

10. An image processing system comprising:
an imaging apparatus that captures an image of an imaging target; and
an image processing apparatus that performs color conversion on the image captured by the imaging apparatus,
wherein the image processing apparatus comprises at least one hardware processor configured to implement:
a reception unit that receives a pair of image information including image information before color conversion and image information after the color conversion,
an accuracy output unit that outputs an indication of an accuracy level of a color conversion characteristic from a plurality of pairs of image information received by the reception unit, and
a display control unit controls a display apparatus to display the indication of the accuracy level output from the accuracy output unit for color areas.

11. An image processing apparatus comprising:
at least one hardware processor configured to implement:
a reception unit that receives a pair of image information including image information before color conversion and image information after the color conversion;

an accuracy output unit that outputs accuracy of a color conversion characteristic from a plurality of pairs of image information received by the reception unit; and a display control unit that displays controls a display apparatus to display the accuracy output from the accuracy output unit on a display apparatus for color areas, wherein, if a user's evaluation received in a user evaluation reception screen is equal to or lower than a predetermined threshold, the display control unit controls the display apparatus to display an image for receiving other pairs of image information.

\* \* \* \* \*